United States Patent [19]

Kurozasa

[11] Patent Number: 6,108,103

[45] Date of Patent: Aug. 22, 2000

[54] FACSIMILE APPARATUS

[75] Inventor: Yoshiharu Kurozasa, Machida, Japan

[73] Assignee: Minolta Co., Ltd., Osaka, Japan

[21] Appl. No.: 08/974,471

[22] Filed: Nov. 20, 1997

Related U.S. Application Data

[63] Continuation of application No. 08/604,245, Feb. 21, 1996, abandoned.

[30] Foreign Application Priority Data

Feb. 24, 1995 [JP] Japan ................................ H-7-037219

[51] Int. Cl.$^7$ ...................................................... H04N 1/00
[52] U.S. Cl. ........................................... 358/405; 358/434
[58] Field of Search ..................................... 358/404, 405, 358/406, 407, 434, 435, 436, 438, 439; 380/18

[56] References Cited

U.S. PATENT DOCUMENTS

| | | | |
|---|---|---|---|
| 4,432,020 | 2/1984 | Onose et al. ............................. | 358/257 |
| 5,280,366 | 1/1994 | Araki ....................................... | 358/453 |
| 5,404,231 | 4/1995 | Bloomfield ............................. | 358/400 |
| 5,579,126 | 11/1996 | Otsuka ..................................... | 358/403 |

FOREIGN PATENT DOCUMENTS

| | | | |
|---|---|---|---|
| 63-236473 | 10/1988 | Japan ............................... | H04N 1/00 |
| 3-124167 | 5/1991 | Japan ............................... | H04N 1/44 |
| 6-276398 | 9/1994 | Japan ............................... | H04N 1/32 |

*Primary Examiner*—Jerome Grant, II
*Attorney, Agent, or Firm*—Burns, Doane, Swecker & Mathis, LLP

[57] ABSTRACT

A communication apparatus which has a function of transmitting a document and a function of receiving a document includes a first sending device for transmitting image data of the document, a password, and the communication apparatus fax number to a plurality of destinations; a sending memory for storing data relating to the plurality of destinations; a receiving memory for storing received image data and a password and a sending apparatus fax number received with the received image data; a device for indicating image data has been received with a password; a printer for printing the received image data stored in the receiving memory when an input password is identical to the password stored in the receiving memory; a reply device for retrieving the sending apparatus fax number from the receiving memory, dialing the sending communication apparatus fax number, and transmitting a reply report indicating the received image data has been printed; a receiver for receiving reply reports; a comparer for comparing the plurality of destinations stored in the sending memory and the reply reports returned by the reply device of the plurality of destinations; and a printer for printing a result of the comparer.

21 Claims, 22 Drawing Sheets

FIG. 28

TO: xxxxxxxxx

RECEIPT (confidential code: 0101)

received date and time: 8-2-94 13:23 received department: yyyyyy

FIG. 29

TO: yyyyyyyy

RECEIPT REQUEST transmit date and time: 7-30-94 10:05 transmit department: xxxxxxx

FACSIMILE APPARATUS

This application is a continuation, of application Ser. No. 08/604,245, filed Feb. 21, 1996 now abandoned.

BACKGROUND OF THE INVENTION

1. Field of the Invention

The present invention relates to a facsimile apparatus, and more specifically relates to a facsimile apparatus capable of confidential transmission and reception.

2. Description of the Related Art

Japanese Unexamined Patent Application Nos. HEI 5-153312 and HEI 5-183668 disclose, for example, facsimile apparatuses capable of confirming on the sending side incoming calls to the receiving side. In these facsimile apparatuses, the reception state of whether or not a transmitted document has been received on the receiving side is automatically transmitted from the receiving side to the sending side.

In conventional facsimile apparatuses having the aforesaid construction, disadvantages arise in that although incoming calls received on the receiving side can be confirmed, said confirmation does not include a receipt or the like returned to the sender. Furthermore, when receiving reception confirmation replies for documents sent in a batch to a plurality of destinations, the receipts confirming reception of the documents are transferred in piecemeal fashion. In such circumstances, recipient confirmation of nonreception is a difficult problem.

OBJECTS AND SUMMARY

An object of the present invention is to eliminate the previously described disadvantages.

A further object of the present invention is to provide a facsimile apparatus having improved confidential transmission and reception functions.

Another object of the present invention is to provide a facsimile apparatus capable of reliably confirming on the sending side that an intended recipient has received a transmitted document.

Another object of the present invention is to provide a facsimile apparatus capable of easily confirming on the sending side that an intended recipient has received a transmitted document.

A still further object of the present invention is to easily handle the reception state of individual destinations even in the case of a confidential transmission to a plurality of destinations.

An even further object of the present invention is to provide a facsimile apparatus capable of easily requesting reception with regard to destinations that have not received confidential transmissions.

These and other objects are attained by a facsimile apparatus which is capable of confidential transmission and reception, the facsimile apparatus comprising a sending means for sending a confidential transmission to a receiving apparatus, a receiving means for receiving a confirmation of confidential reception in reply from the receiving apparatus, a printing means for printing a receipt based on the confirmation, and a control means for controlling the printing means so as to print a plurality of receipts in a batch when a plurality of confirmations are received.

The aforesaid objects are attained by a facsimile apparatus comprising a sending means for sending an image and a password to a plurality of receiving apparatuses, a receiving means for receiving a report from the receiving apparatuses indicating that the received image has been printed based on the password, and a printing means for printing the print states of all of a plurality of receiving apparatuses based on the reports.

The aforesaid objects of the present invention are further attained by a facsimile apparatus provided with a confidential sending and receiving function that allows a transmitted image to be printed on condition that a password is transmitted with the image from the sending apparatus and the same password as the transmitted password has been entered in the receiving apparatus, the facsimile apparatus comprising a first sending means for sending a confidential transmission to a plurality of receiving apparatuses, a receiving means for receiving a report from the receiving apparatus indicating that the image has been printed, a specifying means for comparing reports received by the receiving means with a plurality of receiving apparatuses and specifying which receiving apparatuses have not yet transmitted a report, and a second sending means for sending a request for printing to receiving apparatuses specified by the specifying means.

The aforesaid objects are further attained by a communication apparatus which has a function of transmitting a document and a function of receiving a document, the communications apparatus comprising a first sending means for transmitting image data of the document, a password and sending apparatus fax number to a plurality of destinations, a sending memory means for storing data relating to a plurality of destinations, a receiving memory means for storing image data without printout, a password and sending apparatus fax number when the image data, the password and the sending apparatus fax number are received, a warning means for indicating a document containing a password has been received, a print means for printing image data stored in the receiving memory means when an input password is identical to the password stored in the receiving memory means, a reply means for retrieving the sending apparatus fax number from the receiving memory means, dialing the fax number, and transmitting a reply report indicating the image has been printed, a comparison means for comparing the plurality of destinations stored in the sending memory means and the reply reports returned by the reply means, and a list printing means for printing a result of the comparison means.

The above-mentioned objects and other objects of the invention are clearly described in the following description accompanied by the drawings.

BRIEF DESCRIPTION OF THE DRAWINGS

These and other objects and features of the present invention will become apparent from the following description of the preferred embodiments thereof taken in conjunction with the accompanying drawings, in which:

FIG. 28 shows a sample of a receipt; and

FIG. 29 shows a sample of a receipt request.

In the following description, like parts are designated by like reference numbers throughout the several drawings.

DETAILED DESCRIPTION OF THE PREFERRED EMBODIMENTS

Figure 1:
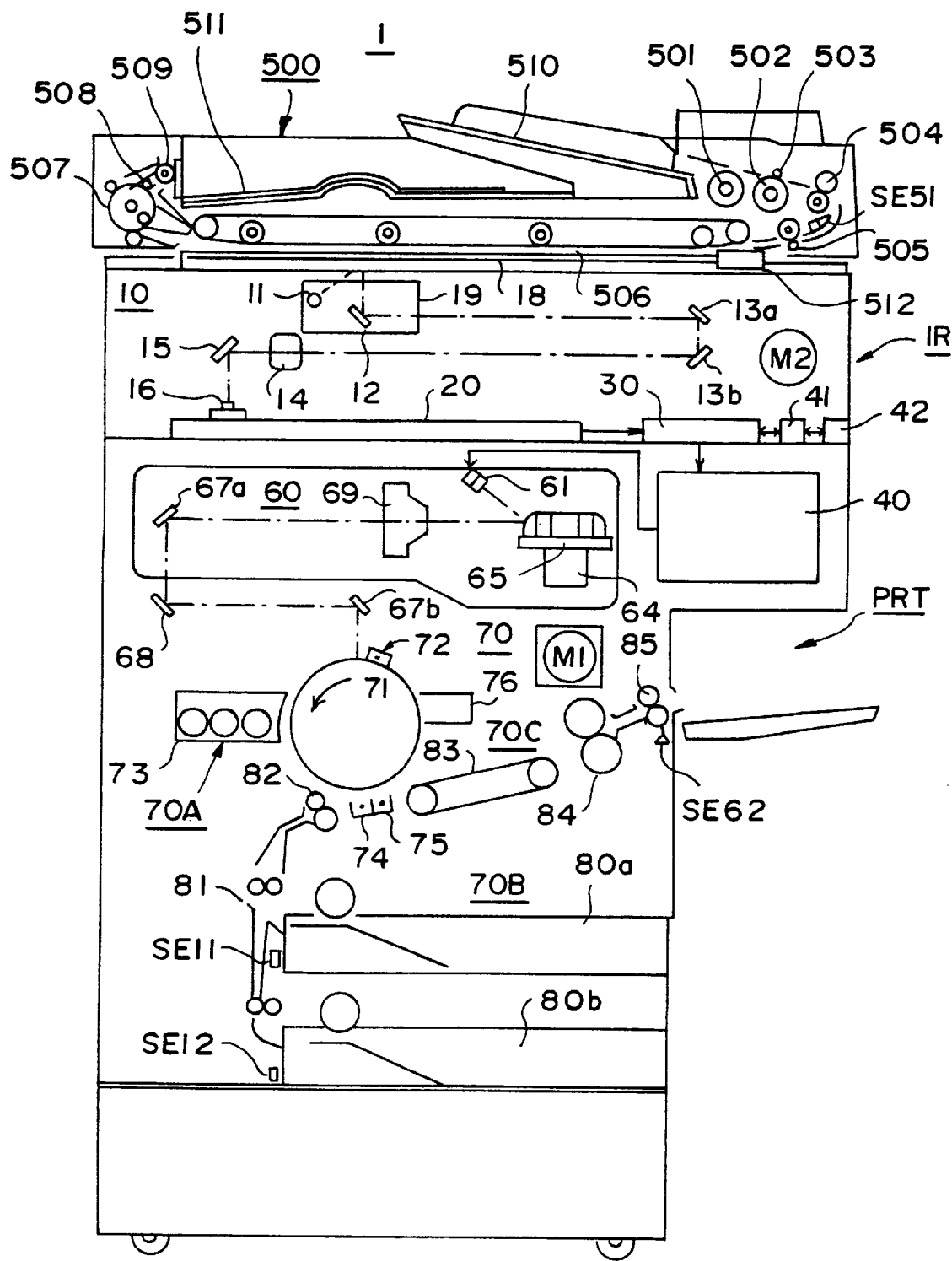
FIG. 1 is a section view of an embodiment of the facsimile apparatus of the present invention.

The embodiments of the present invention are described hereinafter with reference to the accompanying drawings.
(1) General Construction of the Facsimile Apparatus FIG. 1 is a section view showing the general construction of the facsimile apparatus of the present invention. Facsimile apparatus 1 comprises scanning unit 10 for reading documents and converting them to data signals, image signal process section 20 for processing image signals transmitted from scanning unit 10, memory unit 30 for outputting image data received from image signal process section 20 directly to a printing device or storing said image data in memory, and print process section 40 for driving a semiconductor laser 61 based on image data output from memory unit 30. Facsimile apparatus 1 further controls communications such as modulation and demodulation of image data and control signals during facsimile operation with facsimile conversion section 41 which transfers image data and memory unit 30 during facsimile operation.

Facsimile apparatus 1 further comprises a G3 unit 42 for controlling communication with a telephone line network connected via telephone lines, a laser optical unit 60 for directing a laser beam emitted from semiconductor laser 61 to an exposure position on the surface of a photosensitive drum 71, an image forming section 70 for developing an electrostatic latent image formed by said exposure, transferring said image to a recording sheet, and fixing said image on said recording sheet, and a document transporting section 500 for transporting documents and inverting said documents front-to-back, as necessary.

Image reading device IR comprises a scanning unit 10 and image signal process section 20, and the like. Printing device PRT comprises print process section 40, laser optical unit 60, image forming section 70, and the like.

The construction of each section is described hereinafter. Scanning unit 10 includes a scanner 19 that is movable below a glass document platen 18; an optical exposure lamp 11 and a first mirror 12 are combined with the scanner 19. Scanning unit 10 further includes second and third mirrors 13a and 13b for receiving the light reflected by the first mirror 12, a photoelectric conversion element 16 using a CCD array, and a scanning motor M2.

Image signal process section 20, memory unit 30, and facsimile conversion section 41 are described later in the discussion pertaining to the control section.

Print process section 40 generates light from semiconductor laser 61 in accordance with transmitted image data. Laser unit 60 comprises a semiconductor laser 61, a polygonal mirror 65 for deflecting the laser beam, a main lens 69, a reflecting mirror 67a, a reflecting mirror 67b, and the like.

Image forming unit 70 comprises a developing/transfer unit 70A, transport unit 70B, and fixing unit 70C. Developing/transfer unit 70A comprises a photosensitive drum 71 that is driven in rotation in a counterclockwise direction, and around the periphery of which are sequentially arranged from the upstream side in the direction of rotation: a charger 72, a developing device 73, a transfer charger 74, a separation charger 75, and a cleaning section 76. A two-component developer comprising a black toner and a carrier is accommodated in developing device 73.

Transport section 70B comprises cassettes 80a and 80b which accommodate recording sheets, size sensors SE11 and SE12 for detecting recording sheet size, a sheet guide 81, a timing roller 82, and a transport belt 83.

Fixing unit 70C comprises a fixing roller 84 which fuses via heat and pressure the toner image formed on a recording sheet while transporting the same, a discharge roller 85, and a discharge sensor SE62 for detecting the ejection of a recording sheet after the fixing process.

Document transport section 500 automatically transports documents set on the document feed tray 510 onto the glass document platen 18, and ejects the documents read by the scanner 19 to the document discharge unit 511. Document transport section 500 comprises the document feed tray 510 for placement of documents, the document discharge section 511 for discharging documents, a feed roller 501 for feeding documents one sheet at a time, a guide roller 502, a guide pad 503, an intermediate roller 504 for transporting documents, a registration roller 505, a transport belt 506, an inverting roller 507, a switching member 508, a discharge roller 509, and a document scale 512 disposed on the document platen 18 as a document position reference.

Figure 2:
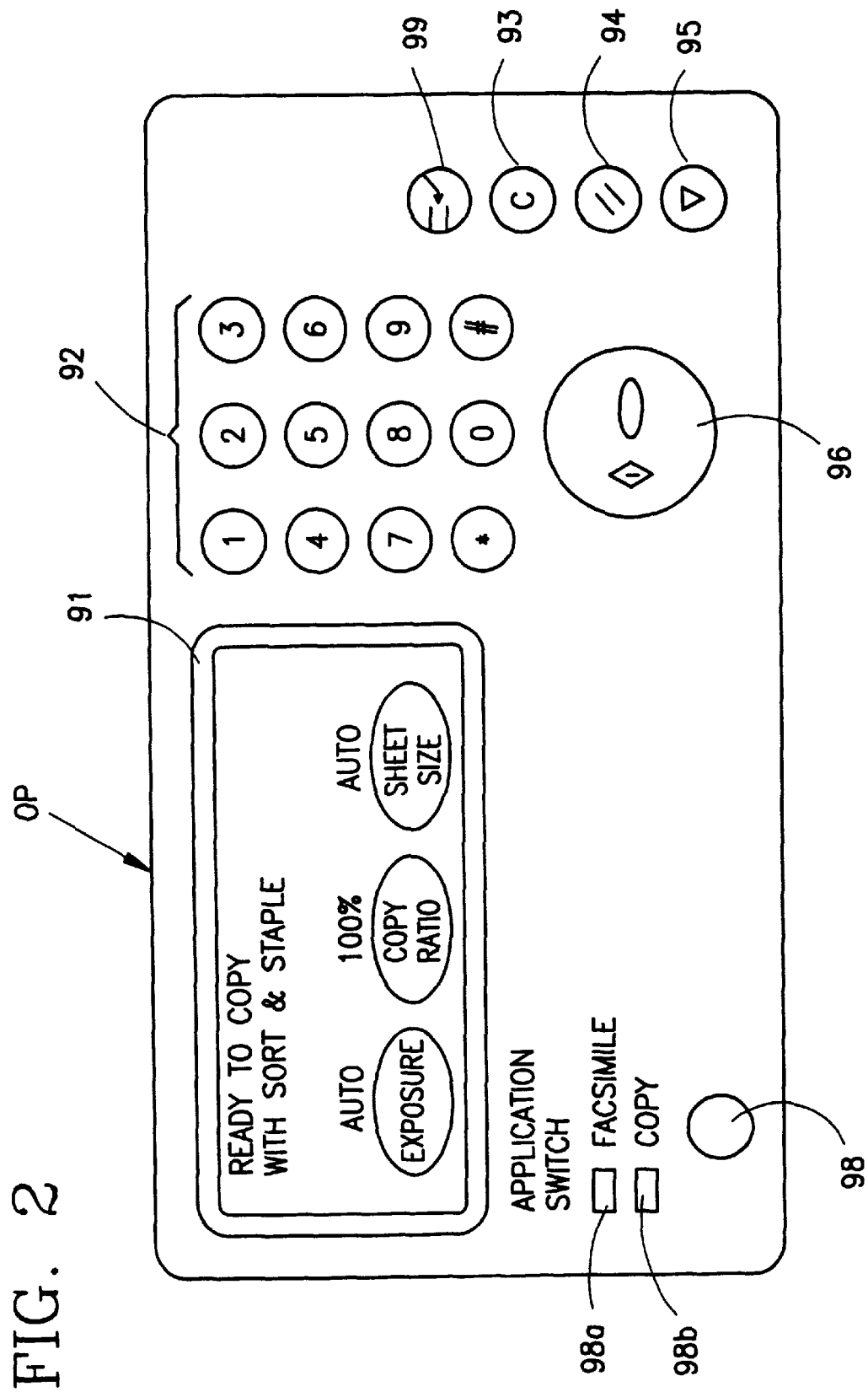
FIG. 2 is a top view of the operation panel of the facsimile apparatus of FIG. 1.

The operation panel OP is described below. Operation panel OP is provided on the top of the facsimile apparatus 1. FIG. 2 is a top view showing the construction of the operation panel OP. Operation panel OP is provided with a liquid crystal touch panel 91, a ten-key pad 92 for entering numerical settings such as the number of copies, copy magnification, recipient fax number and the like, a clear key for returning numerical settings to a standard value of "1", a panel reset key 94 for returning the values set within the apparatus to standard values, a stop key 95 for terminating copy operation and facsimile operation, a start key 96 for starting a copy operation and facsimile operation, and an interrupt key 99 for copying or fax transmission by interrupting an on-going copy process or auto-printing process.

Operation panel OP further comprises an application switching key 98 for switching between facsimile modes and copy modes, a display section 98a for displaying a selected facsimile mode, and a display section 98b for displaying a selected copy mode.

Liquid crystal touch panel 91 displays copying apparatus operational states such as exposure levels, copy magnification, recording sheet size, and the like; various anomaly states of the copying apparatus such as paper jam, service call, paper empty, and the like; facsimile operational states during communications such as recipient fax number, transmission resolution, and facsimile modes such as polling and the like, as well as other information. Liquid crystal touch panel 91 also may be used for automatic selection of specifying copy operations such as density, copy magnification, recording sheet size and the like, as well as facsimile operations such as transmission resolution and the like, and mode specification.

(2) Control Section

Figure 3:
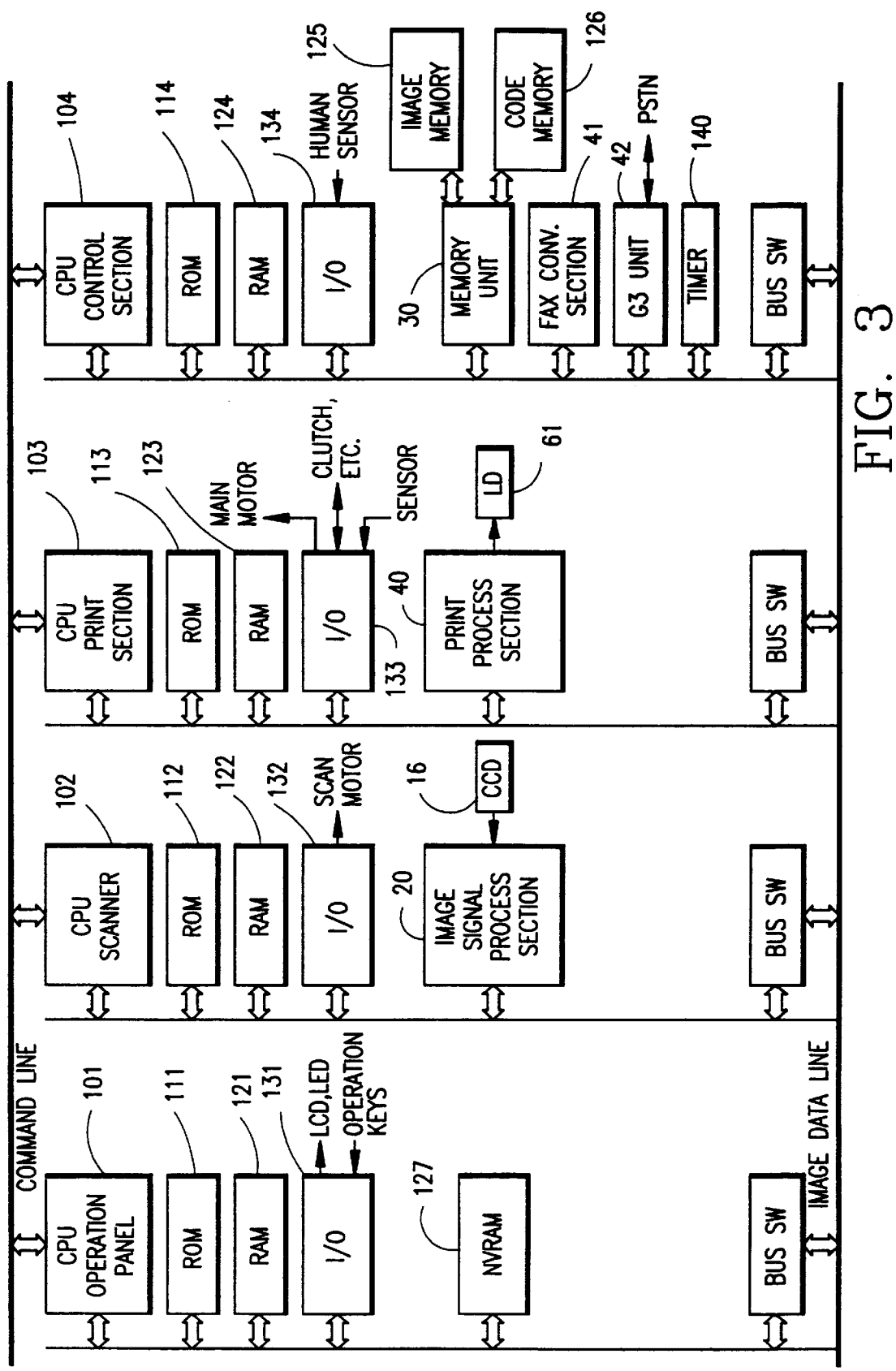
FIG. 3 is a block diagram showing the construction of the control section of the facsimile apparatus of FIG. 1.

The control section of facsimile apparatus 1 is described below. FIG. 3 is a block diagram showing the construction of control section 100 of facsimile apparatus 1. Control section 100 comprises a core of four individual CPUs 101~104. These CPUs 101~104 are respectively connected to ROM 111~114 which store programs, and RAM 121~124 which are used as work areas.

Each CPU 101~104 is mutually connected via a command line, so as to exchange necessary command data. Image data input/output is accomplished through an image data line, and the various sections are respectively connected to said data line via bus switches BUS SW.

Each CPU is described below. CPU 101 executes control of input from the various operation keys of operation panel OP and display output to the display sections. The operation panel initial mode settings, total counter, and section discrimination counter are stored in NVRAM 127.

CPU 102 controls the actuation of scanning section 10 and controls the various parts of image signal process section 20. CPU 103 controls print process section 40, laser unit 60, and image forming unit 70.

CPU 104 executes processing for setting the operation mode and timing adjustments for the entire control section 100. Read image data are temporarily stored in memory 125 and code memory 126 via the control of memory unit 10. These image data are read out and output to print process section 40 when the copy mode has been set, or are output to facsimile conversion section 41 when facsimile transmission has been set, and are thereafter output to the telephone line (PSTN) via G3 unit 42. During facsimile reception, image data received from the telephone line are temporarily stored in code memory 126 and image memory 125 via G3 unit 42 and facsimile conversion section 41, then said image data are read and output to print process section 40. During facsimile mode, data conversions are executed such as the pixel density conversion process and the like between memory unit 30 and G3 unit 42 by controlling facsimile conversion section 41.

Image signal process section 20 is described below. Image signal process section 20 processes image signals output from photoelectric conversion element 16, and outputs image data to memory unit 30. Image signal process section 20 comprises an analog-to-digital (A/D) converter, shading correction section, variable magnification process section, and image quality correction section. Image signals input from photoelectric conversion element 16 are subjected to A/D conversion, and quantized as 8-bit image data for each pixel. The image data are then subjected to various processing such as shading correction, variable magnification, image quality correction and the like before being output.

Memory unit 30 is described below. Memory unit 30 comprises a binarizer for creating binary data based on parameters received from the switching section and CPU 104, a multiport image memory 125 provided with a capacity to store two A4 size pages at 400 dots-per-inch (dpi) resolution, an encode section provided with a compressor and expander capable of operating with mutual independence, a multiport code memory 126, a rotation section, and a multi-level converter for creating multi-level data based on parameters received from CPU 104. CPU 104 controls all the aforesaid elements.

Facsimile conversion section 41 is described below. Facsimile conversion section 41 is positioned between memory unit 30 and G3 unit 42, and converts the format of the image data during transmission and reception. Image data conversion includes the following items.

Image data pixel density conversion

Image data enlargement and reduction

Code data bit width conversion

Code data encoding method conversion

These processes are all executed by CPU 104.

(3) Operation Sequence of the Entire Facsimile Apparatus in Each Operational Mode The operation sequence of the entire facsimile apparatus in the fax transmission mode and fax reception mode is described below with reference to FIGS. 4 and 5. Requests transmitted among CPUs 101~104, responding commands and the like, and data flow are the focus of the following discussion, whereas nonessential requests, and responding commands and the like are omitted from the following discussion.

(a) Fax transmission mode

Figure 4:
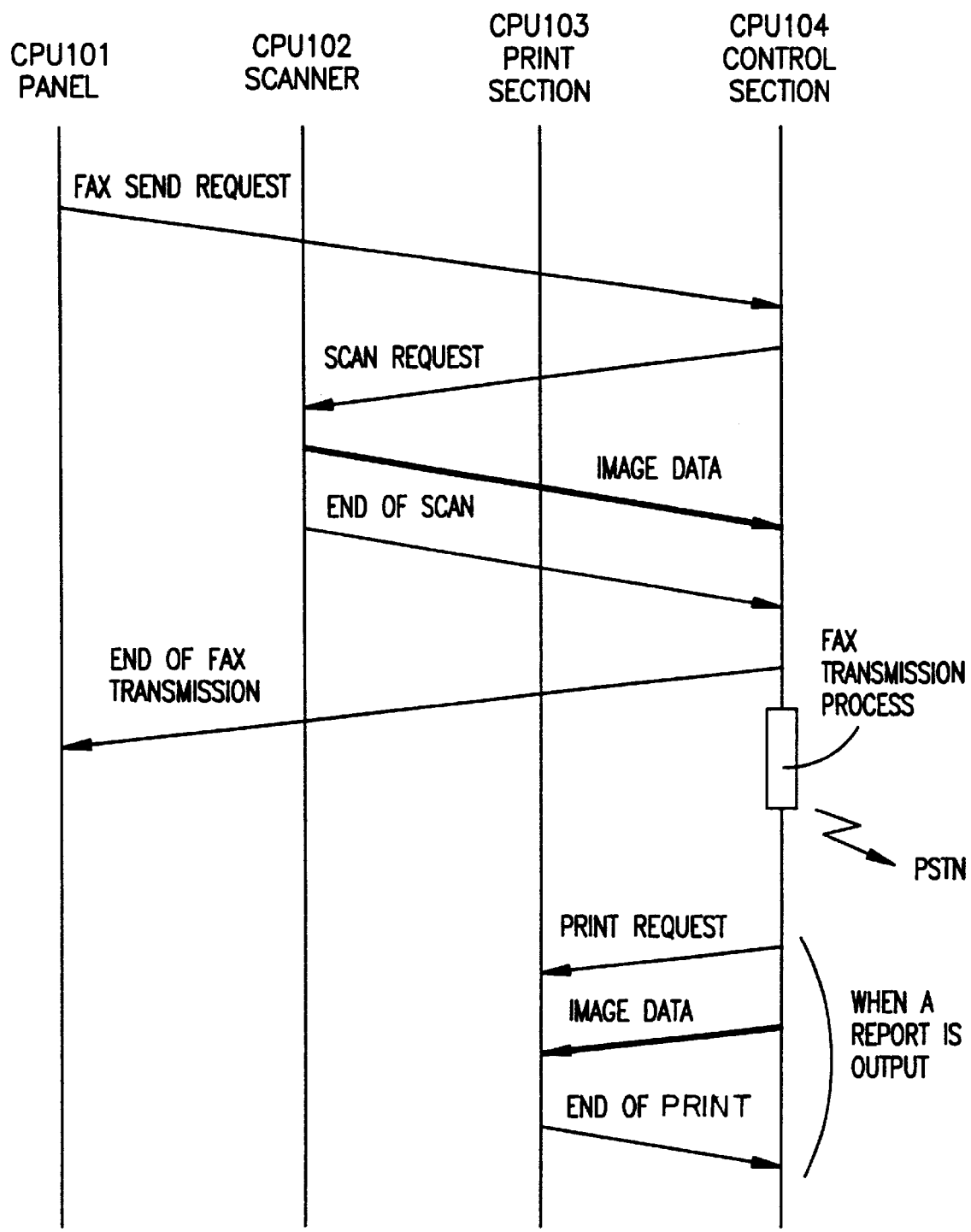
FIG. 4 is a sequence drawing showing the operation of the fax transmission mode.

FIG. 4 shows the operational sequence in the fax transmission mode. In the fax transmission mode, image data read by image reading device IR are temporarily written to image memory 125, subjected to compression processing, and stored in code memory 126, and thereafter undergo data conversion in facsimile conversion section 41 for fax transmission. First, a send request is output from CPU 101 to CPU 104 by pressing the start key 96, and when this request is received a scan request is output from CPU 104 to CPU 102.

Then, CPU 102 starts scanning via the aforesaid request, and when the image region of the document is reached, executes image processing in accordance with the selected image processing mode. The processed image data are output to memory unit 30, and stored in image memory 125. Thereafter, CPU 104 executes a compression process for the image data stored in image memory 125, and stores the code data in code memory 126.

When reading of the document image via scanning is completed, a reply indicating that scanning has ended is output from CPU 102 to CPU 104, and a signal indicating that the fax transmission has ended is output from CPU 104 to CPU 101.

When the image (code) data to be transmitted to the code memory 126 are all stored, CPU 104 controls G3 unit 42 and specifies the connection to the telephone line. The receiving side is called according to the aforesaid directive, and the telephone line connection is completed, and a line connection reply is received.

Next, CPU 104 reads the code data and outputs said data to facsimile conversion section 41 where it is converted to image data. After CPU 104 modulates the image data via a modem within G3 unit 42, said data are transmitted via a telephone line (PSTN) to the receiving side. When the transmission of the image data ends, CPU 104 sends a line disconnect request to the receiving side, executes a line disconnect process, and clear memory to end the operation.

When a report is output following the end of a fax transmission, or when an error report is output due to the occurrence of an error during transmission, a print request is output from CPU 104 to CPU 103. This request causes image data (report data) to be output from CPU 104 to print processing section 40, and print processing section 40 starts printing said data. When the printing of the report ends, a print end reply is output from CPU 103 to CPU 104. Then, memory is cleared and the operation ends.

(b) Fax reception mode

Figure 5:
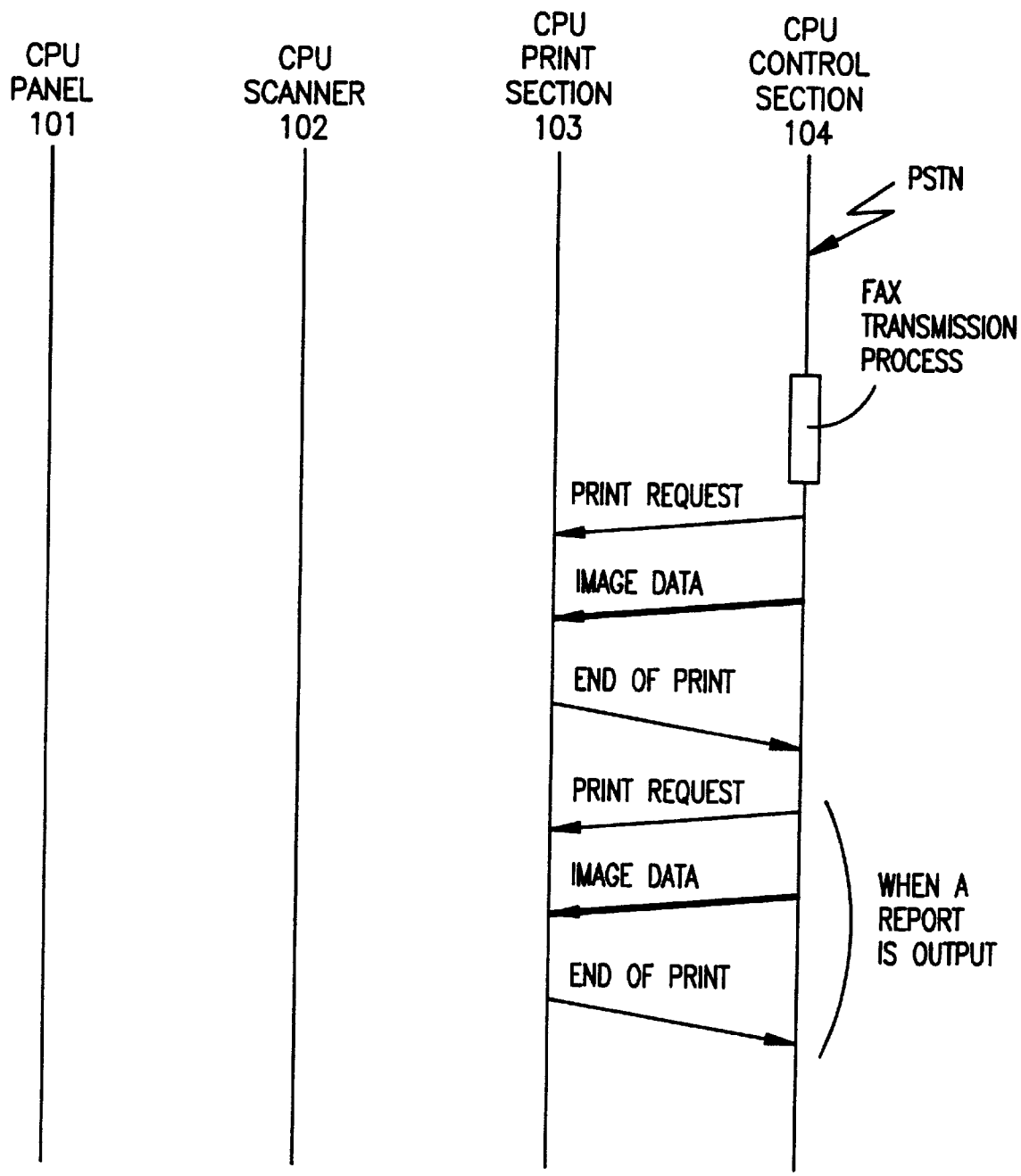
FIG. 5 is a sequence drawing showing the operation of the fax reception mode.

FIG. 5 shows the operational sequence in the fax reception mode. In the fax reception mode, received image data are subjected to data conversion by facsimile conversion section 41, and are stored in code memory 126. After being subjected to an expansion process, the data are written to image memory 125, and thereafter are read out to printing device PRT and printed.

When CPU 104 receives a call request from the transmission side, CPU 104 connects the telephone line. Then, CPU 104 sets the settings for the image reception mode, such as encoding method, reception magnification, number of pixels in 1-line of the reception image, maximum number of lines permitted for line error, and the like.

When the code memory 126 completes reception preparation, the image data output from the sending side is demodulated by the internal modem of G3 unit 42, subjected to data conversion by facsimile conversion section 41, and thereafter stored in the code memory 126. When the image data reception ends, the CPU 104 disconnects the telephone line, and executes a print request to CPU 103.

After printing is requested, CPU 104 expands the code data via an expansion process. The expanded image data are written to image memory 125. The image data read out from image memory 125 are then output to the printing device PRT for printing. When printing is completed, a print end reply is output from CPU 103 to CPU 104, and when said reply is received, CPU 104 clears memory to end the operation.

When a report is output after fax transmission ends, or when an error report is output due to the occurrence of an error during transmission, a print request is output from CPU 104 to CPU 103. Thus, image data (report data) is output from CPU 104 to the print processing section, which starts printing. When the printing of the report ends, a print end reply is output from CPU 103 to CPU 104. Then, memory is cleared to end the operation.

(4) Controls Executed by Each CPU

The controls executed by each CPU 101~104 are briefly described below.

(a) Operation panel (CPU 101)

Figure 6:
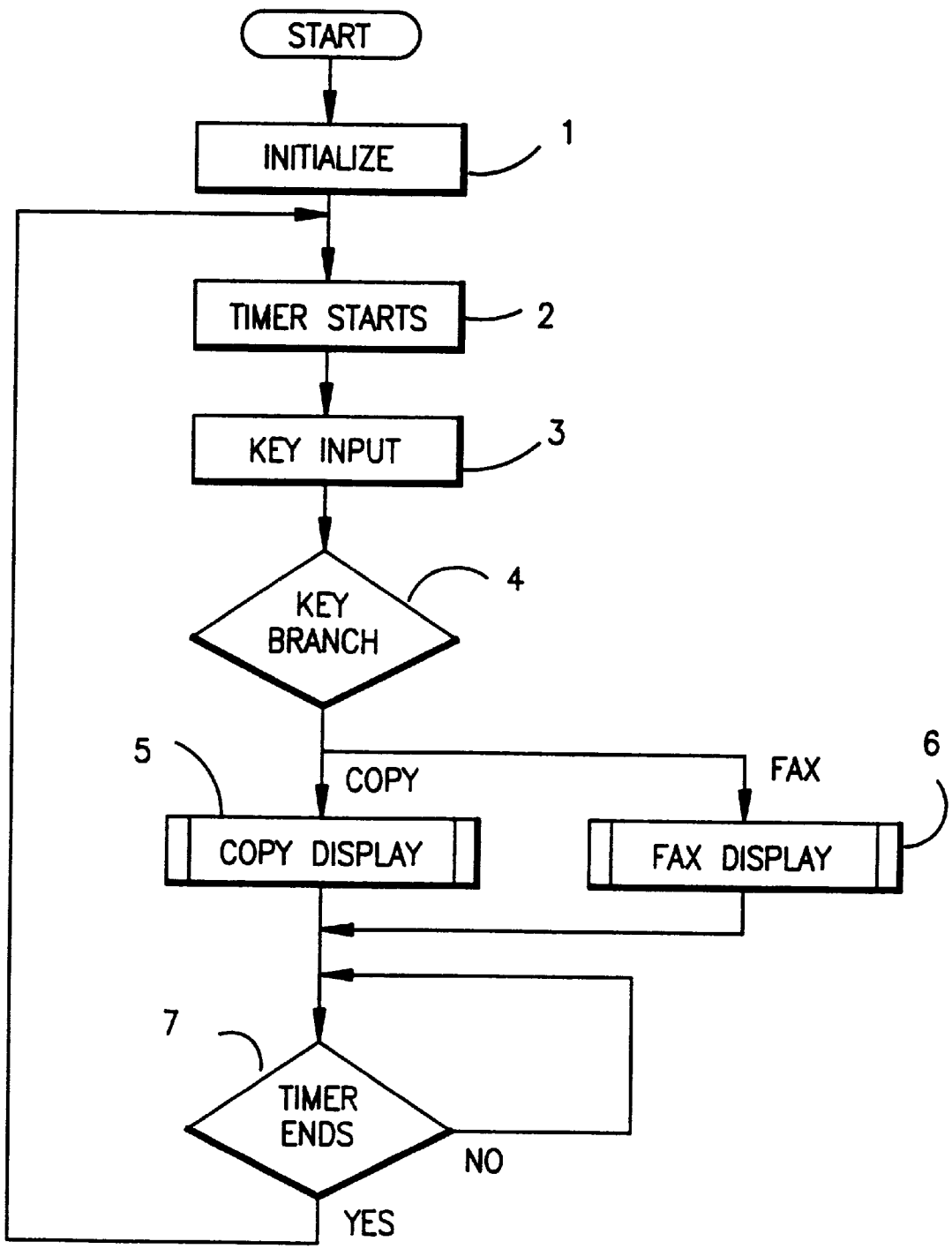
FIG. 6 is a flow chart showing the operation panel unit.

First, the operation panel is described below. FIG. 6 is a flow chart showing the processes of the operation panel. After power to facsimile apparatus 1 has been turned ON, the panel display program stored in ROM 111 and initial display mode stored in NVRAM 127 are read by the initialization routine (step #1; "step" is omitted hereinafter), and the initial screen is displayed on operation panel OP. Then, a timer within CPU 101 is started for the auto-clear function (#2), and key input from operation panel OP is awaited. When key input occurs (#3), the content of the key input is detected by key branching (#4), and the program branches to the display mode corresponding to the key input. For example, if application switching key 98 is pressed on the operation panel OP when the copy operation screen is being displayed, the program branches to the fax display routine (#6), whereas if the application switching key 98 is pressed when the fax operation screen is being displayed, the program branches to the copy display routine (#5). If no key input occurs when a time previously recorded in NVRAM 127 is elapsed after the final key operation, the timer ends (#7), and operation panel OP is automatically set in the initial mode.

The fax display routine (#6) is described below with reference to the flow chart of FIG. 7. In the fax display routine, the fax display screen is read out from NVRAM 127 (refer to FIG. 8), and is displayed on the liquid crystal touch panel 91 of the operation panel OP (#8). Then, the timer for auto-clearing the fax application is started (#9), and entered data from the liquid crystal touch panel 91 is awaited. When data are entered via the liquid crystal touch panel 91 (#10), the content of the key input is detected by key branching (#11), and the program branches to the display mode corresponding to the input key. For example, when the recipient selection key (refer to TP4 of FIG. 8) is pressed, the program moves to the recipient selection routine (#12), so as to look up the desired recipient from among recorded telephone numbers. If the application key TP2 is pressed, the program moves to the application display routine (#13), and if the application selection key 98 is pressed, the copy display mode routine is executed (#5). When a recipient has been selected in the recipient selection routine (#12) and the start key 96 is pressed, the program moves to the fax transmission routine (#15), and a fax transmission request is transmitted to CPU 104.

If the internal timer ends without additional key input after the elapse of a previously recorded time stored in NVRAM 127 following a final key operation (#16: YES), the operation panel OP automatically returns to the basic screen display (#8).

Figure 7:
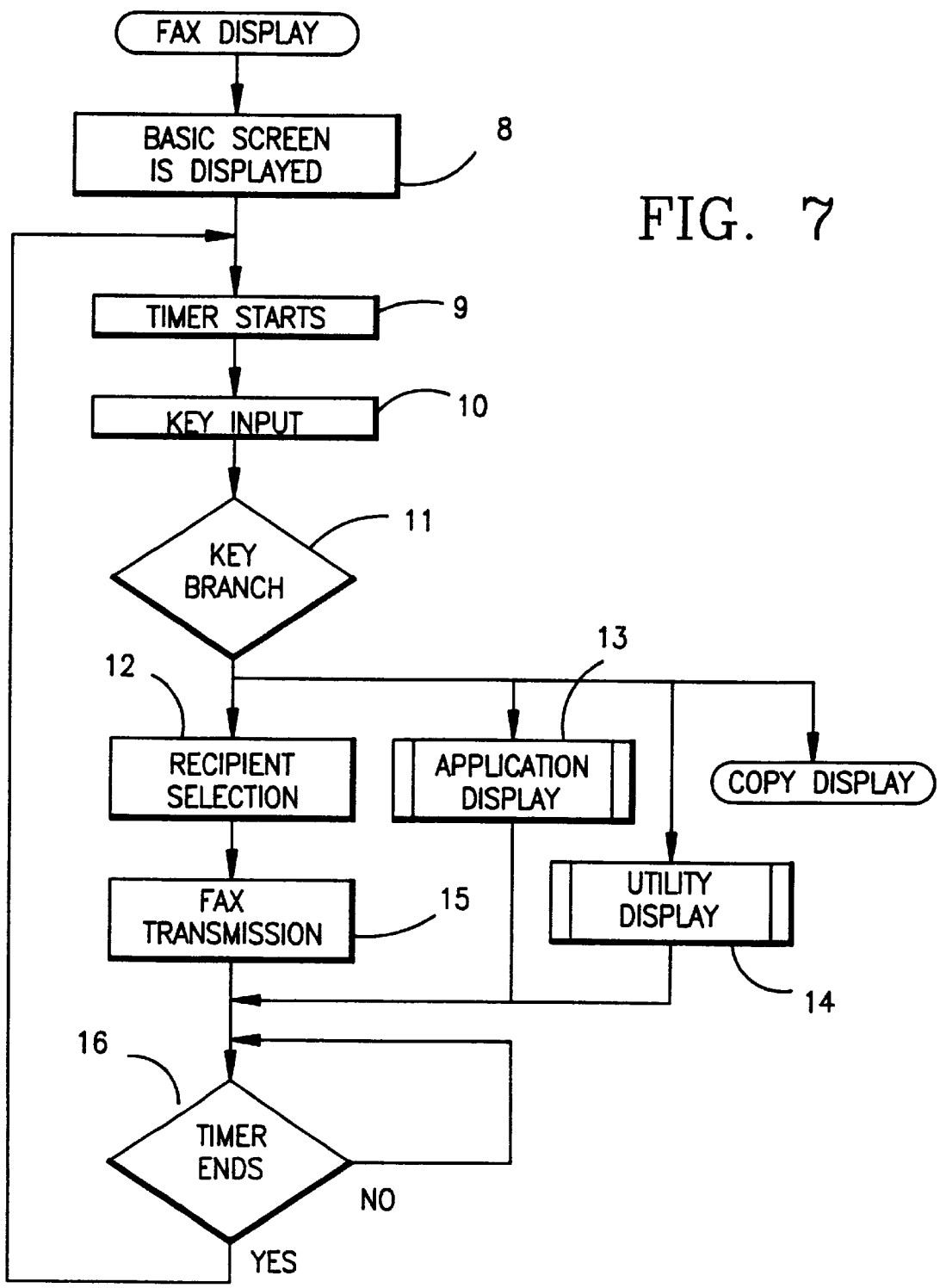
FIG. 7 is a flow chart showing the contents of the fax display routine.
Figure 8:
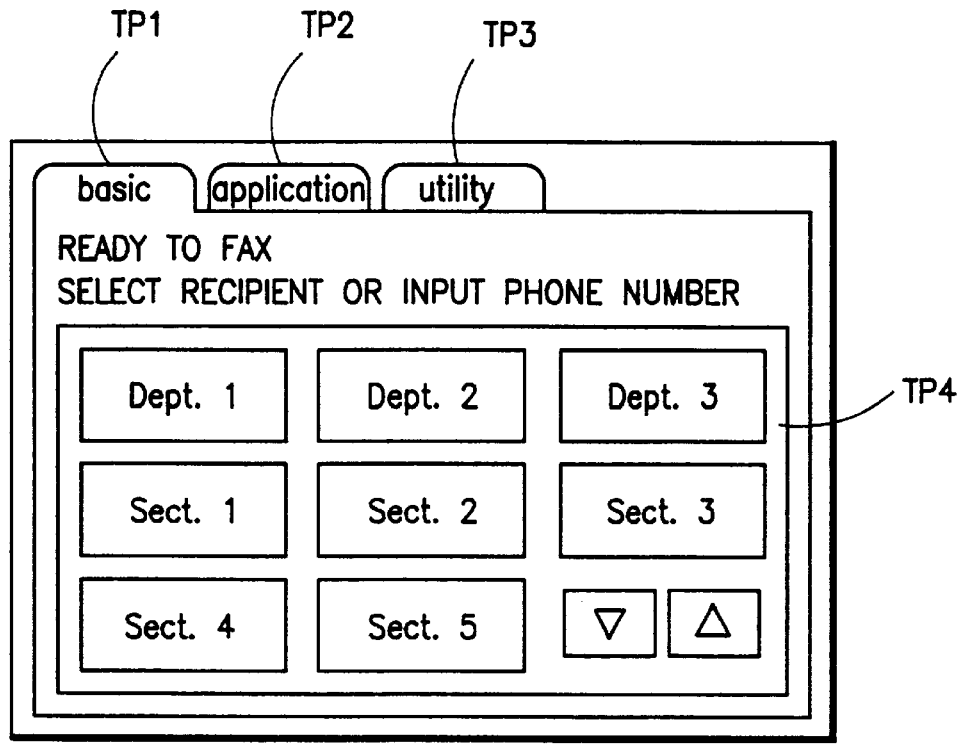
FIG. 8 shows the initial fax screen on the liquid crystal touch panel.
Figure 9:
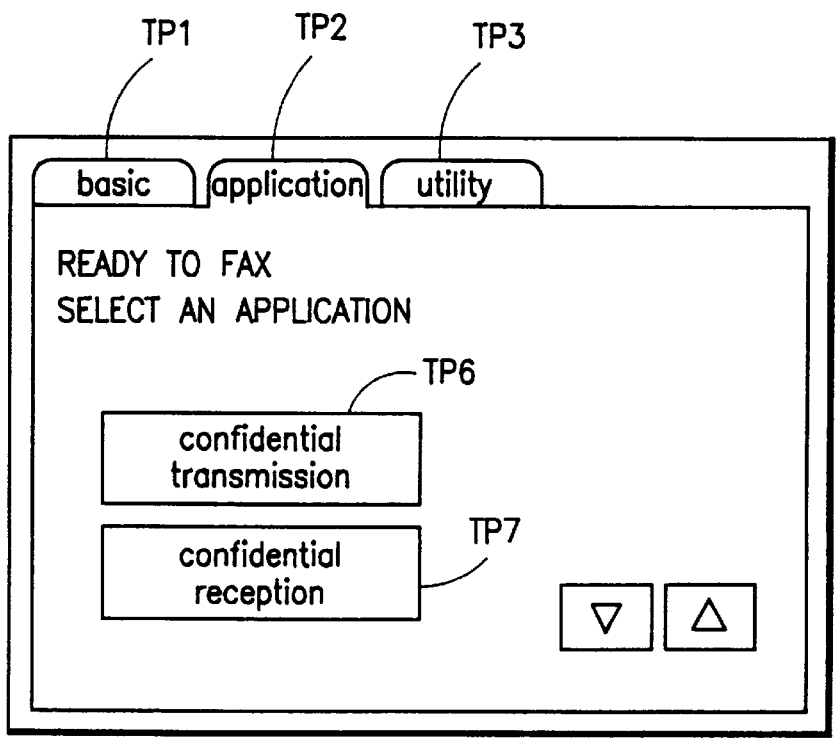
FIG. 9 shows the application fax screen of the liquid crystal touch panel.
Figure 10:
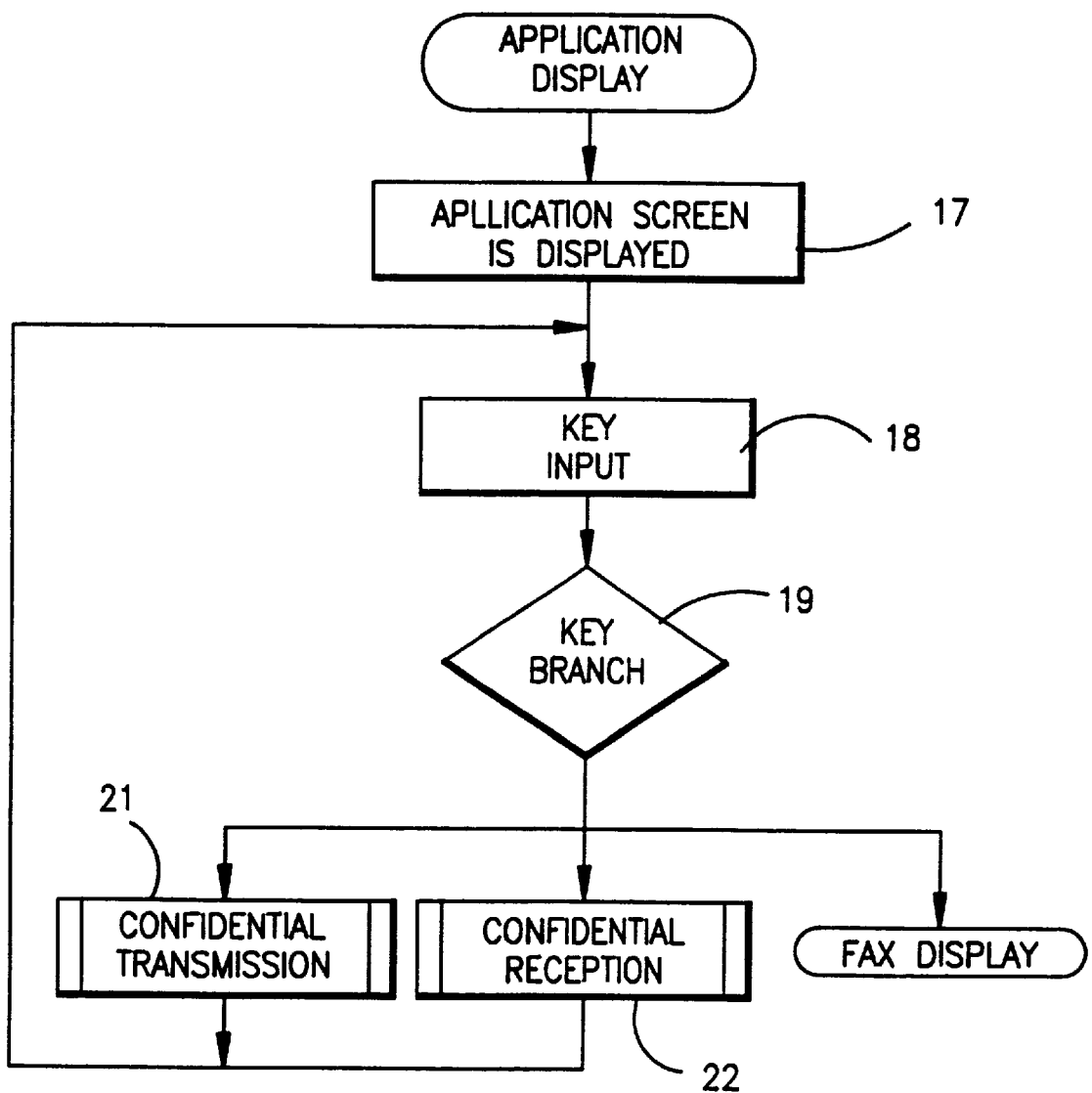
FIG. 10 is a flow chart showing the contents of the fax application display routine.

The application display routine of #13 of FIG. 7 is described below with reference to the flow chart of FIG. 10. In the application display routine, the fax application screen (refer to FIG. 9) is read out from NVRAM 127 so as to be displayed on liquid crystal touch panel 91 (#17), and input from liquid crystal touch panel 91 is awaited. When there is input from liquid crustal touch panel 91 (#18), the content of the key input is detected by key branching (#19), and the program moves to the display mode corresponding to the key input. For example, if the confidential transmission key TP6 (refer to FIG. 9) is pressed, the program moves to the confidential transmission routine (#21). If the basic key TP1 is pressed, the program moves to the fax display routine (#6).

(b) Control section (CPU 104)

Figure 11:
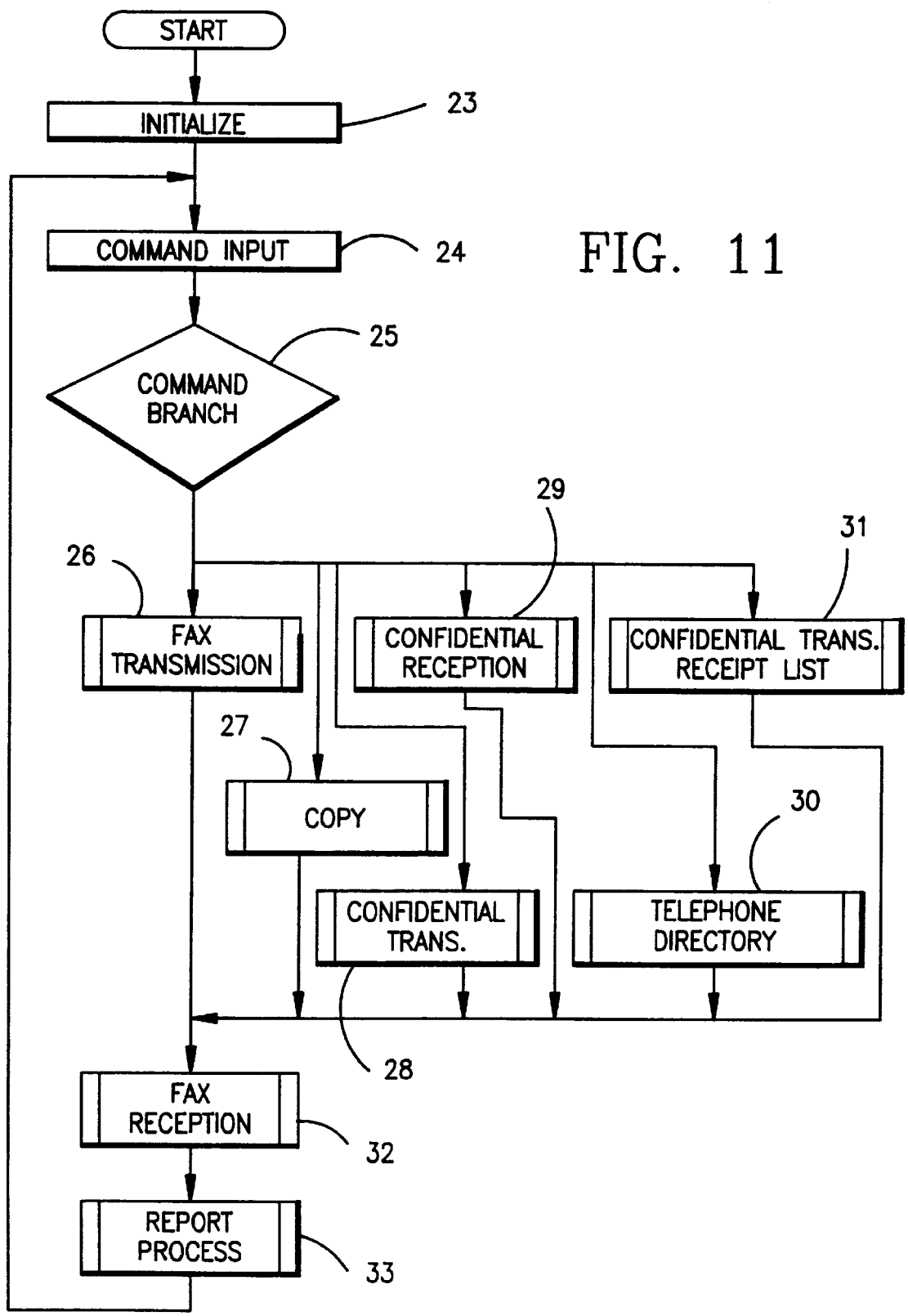
FIG. 11 is a flow chart showing the contents of the control of the control section.

FIG. 11 shows a flow chart of the operation of the control section. In the control section, initialization is accomplished by a program stored in ROM 114 after power is turned ON (#23). Thereafter, commands from the operation control section (CPU 101) are awaited. If a command is input from the operation control section (CPU 101) (#24), the content of the command is detected by command branching (#25), and processes corresponding to said command are executed (#26~#31). For example, when a fax transmission request command is input, the fax transmission process is executed (#26), whereas when the copy request command is input, the copy process is executed (#27). If a confidential transmission request command is input, the confidential transmission process is executed (#28). If the G3 unit 42 receives a fax reception from the telephone line (PSTN), the fax reception control routine is executed (#32). When an error occurs, the report process is executed (#33).

(c) Scanner section (CPU 102)

Figure 12:
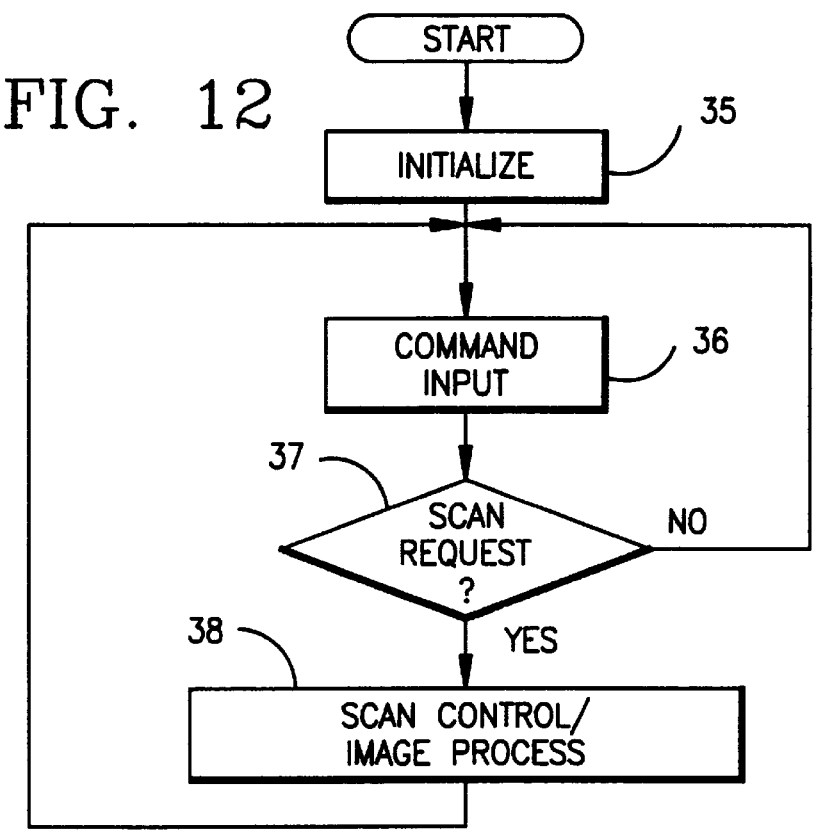
FIG. 12 is a flow chart showing the contents of the scanner operation.

FIG. 12 is a flow chart showing the contents of the scanner section operation. The scanner section is initialized by a program stored in ROM 112 after power is turned ON (#35). Thereafter, reception of commands from the control section (CPU 104) is awaited. If a scan request (#37) is detected when a command is input from the control section (#36), a scan control/image process routine is executed (#38). If a scan request is not received, command input is awaited. In the scan control/image process routine (#38), scan and image processes are executed in the image reading mode, e.g., resolution and halftone, which are transmitted together with the scan request from the control section, and image data are subsequently transmitted to the control section.

(d) Print section (CPU 103)

Figure 13:
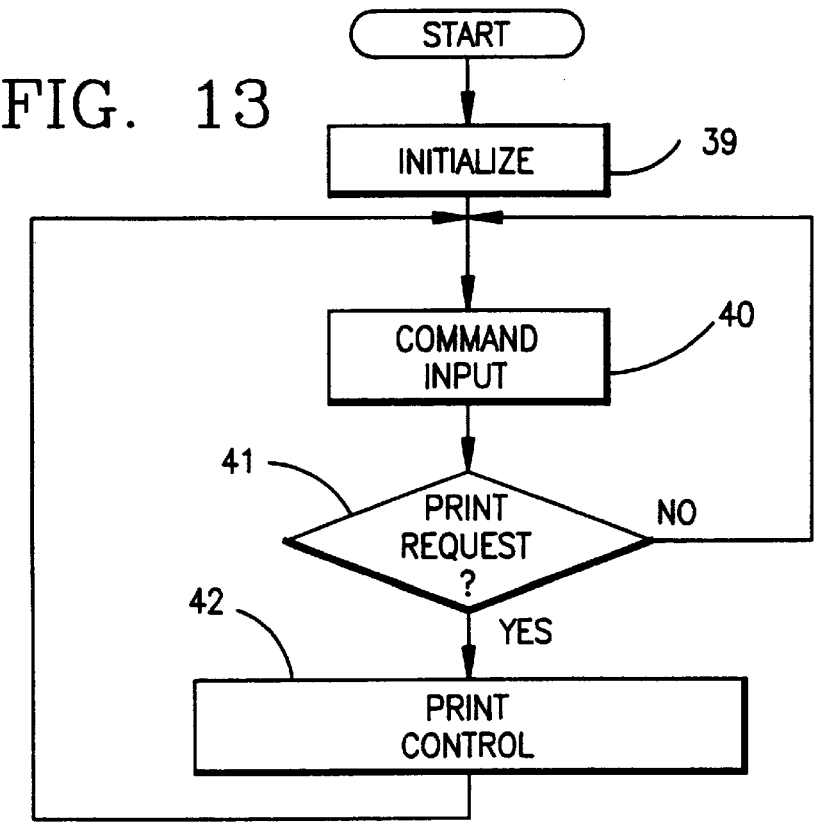
FIG. 13 is a flow chart showing the operation of the printing section.

FIG. 13 is a flow chart showing the content of the operation of the print section. The print section is initialized by a program stored in ROM 113 when the power is turned ON (#39). Thereafter, reception of commands from the control section are awaited. When a command is received from the control section (#40), and a print request is detected by the print request branch (#41), the print control routine is executed (#42). If a print request is not detected, command reception is awaited. In the print control routine (#42), a print process is executed in the print mode, e.g., resolution, halftone, which is transmitted together with the print request from the control section, and image data are subsequently transmitted to the printing device PRT for printing.

(5) Confidential Transmission

Confidential transmission is a function wherein confidential code data are appended and transmitted by the fax transmission device, and printing of the transmission is prevented when the confidential code is not input in the fax reception device. Confidential transmission is possible not only for individual recipients, but also allows batch transmissions to a plurality of recipients by using the group transmission recording function of the fax transmission device.

Figure 14:
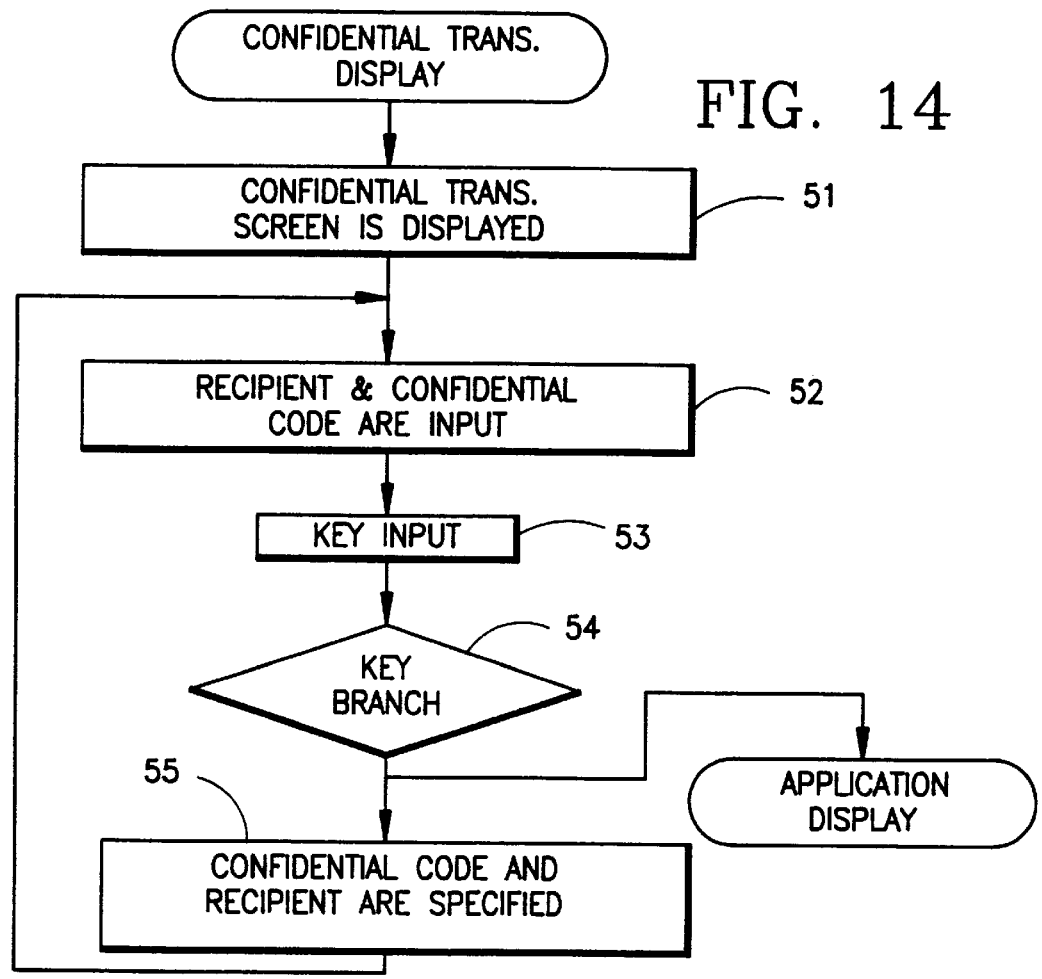
FIG. 14 is a flow chart showing the operational content of the confidential transmission display section.
Figure 15:
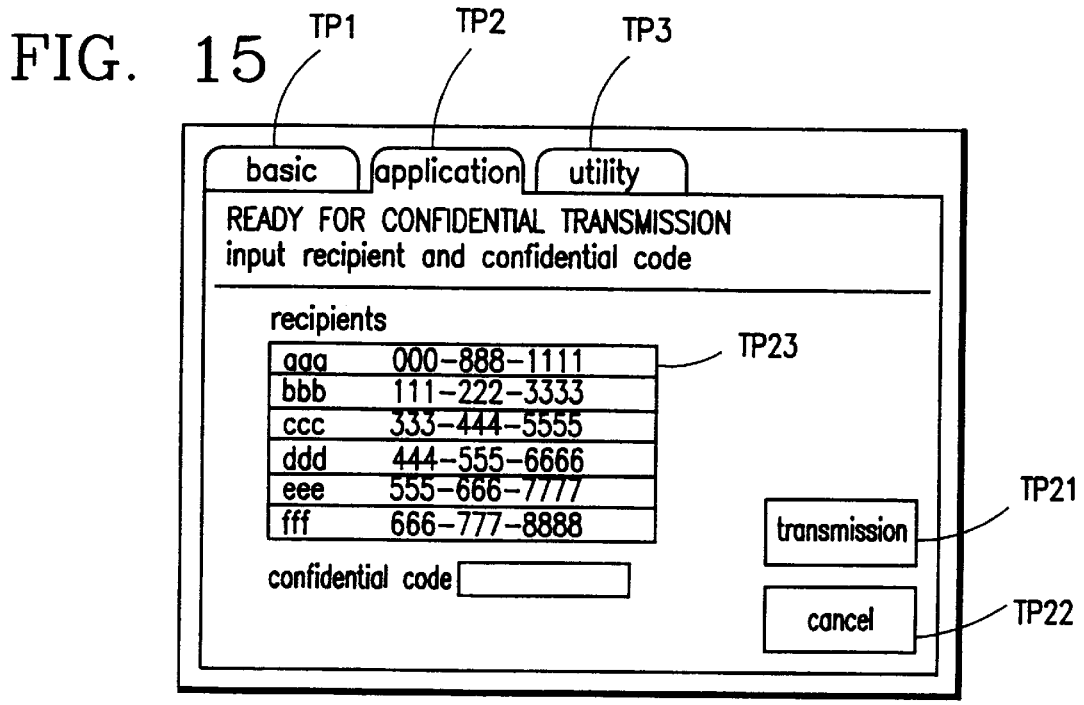
FIG. 15 is an illustration showing the confidential transmission screen on the liquid crystal touch panel.

(a) Operation panel section (CPU 101) of the confidential transmission display routine FIG. 14 is a flow chart showing the contents of the processing of the operation panel section in the confidential transmission display routine. In the confidential transmission display routine, the confidential transmission screen (refer to FIG. 15) is read out from NVRAM 127 and displayed on the liquid crystal touch panel 91 of the operation panel OP (#51), and the liquid crystal touch panel 91 awaits input. When there is input from liquid crystal touch panel 91 (#52, #53), the content of said key input is detected by key branch (#54), and processing is executed in accordance with said key input. For example, when the transmission key TP21 is pressed after a confidential code is input following recipient selection (TP23 in FIG. 15), the confidential code and recipient are specified to the control section. If the cancel key TP 22 is pressed, the program moves to the application display routine (#13).

(b) Control section (CPU 104) in the confidential transmission routine

Figure 16:
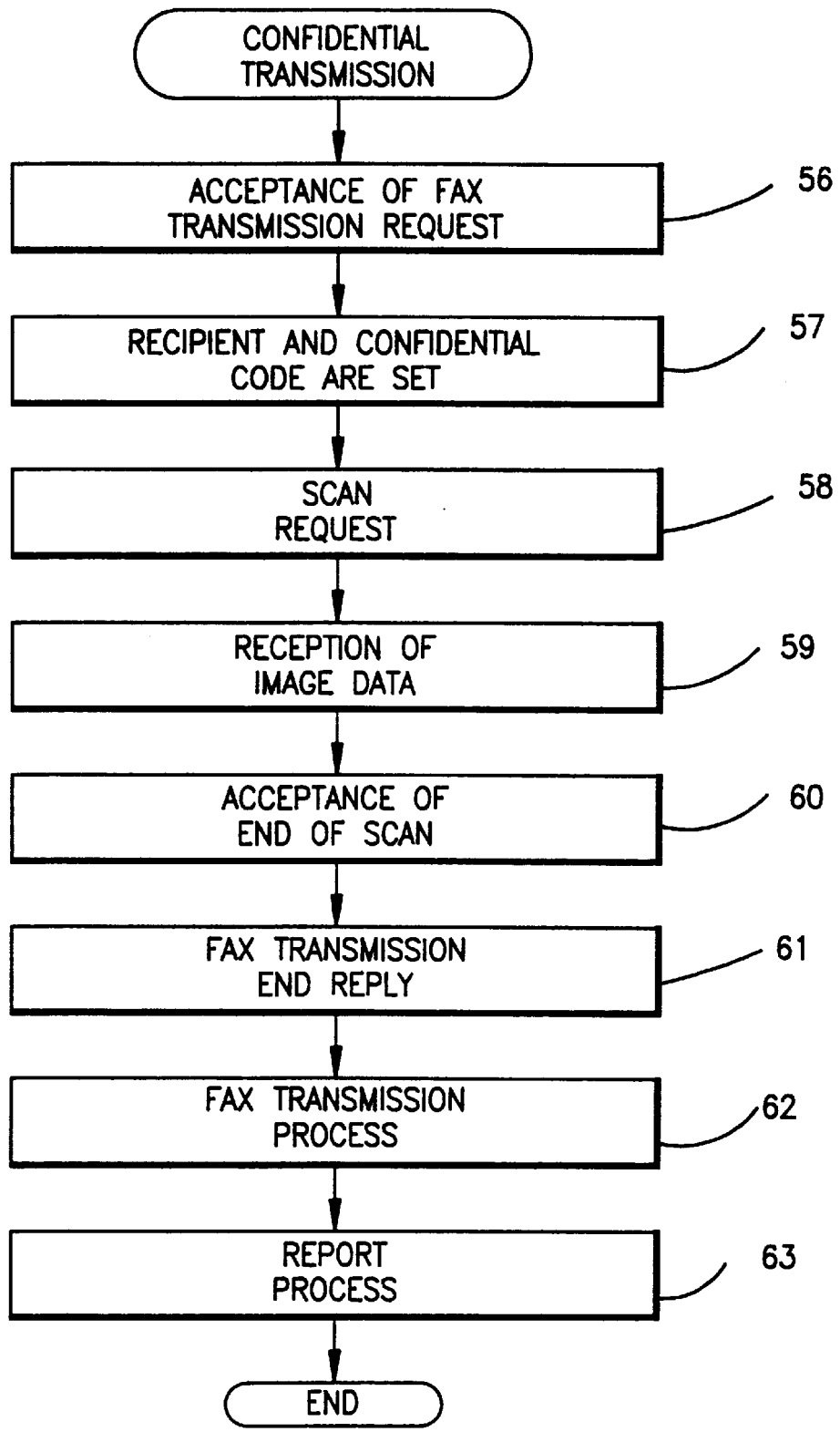
FIG. 16 is a flow chart showing the operational content of the confidential transmission control section.

FIG. 16 is a flow chart showing the contents of the operation of the control section in the confidential transmission routine. The recipient and confidential codes are set via input from the operation panel OP (#57) based on the fax transmission request from the operation panel OP (#56), and a scan request is executed by the scan section (#58). Then, after image data are received (#59) and a scan end reply is received (#60), a fax transmission end reply is sent to the operation panel (#61). Thereafter, the fax transmission process is executed (#62), and the report process is executed (#63).

(6) Fax Reception (confidential reception)

In fax reception, there are three types of documents (confidential document, receipt document, and other) considered. A sample of a receipt is shown in FIG. 28. The receipt image data are stored in ROM 114 and are called up during transfer.

(a) Control section (CPU 104) of the fax reception control routine

Figure 17:
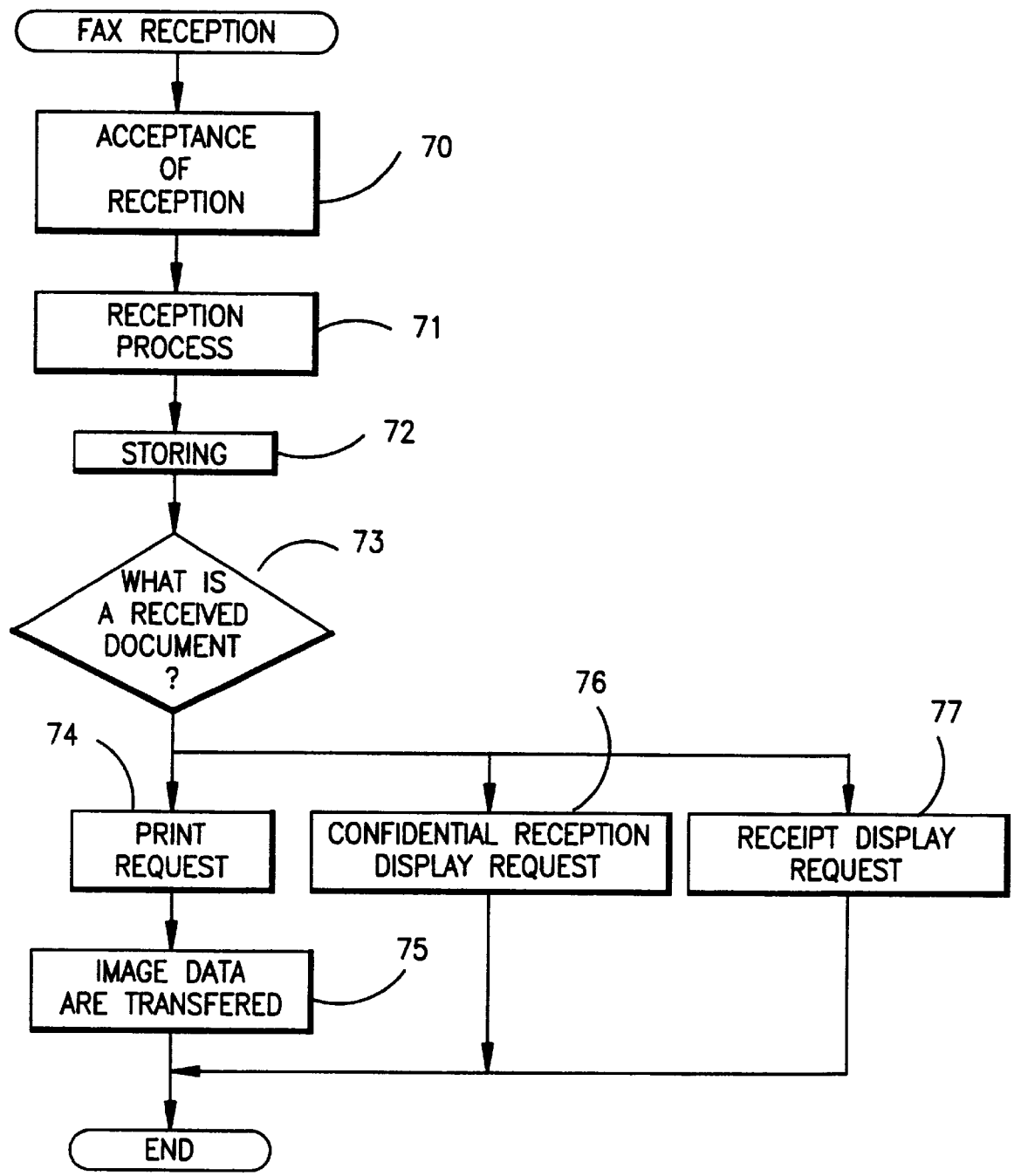
FIG. 17 is a flow chart showing the contents of the fax reception control operation.

FIG. 17 is a flow chart for the control section in the fax reception control routine. In the fax reception control routine, after a fax reception is received (#70), a reception process is executed (#71), and stored in memory (#72). In the reception process (#71), a received document is discriminated by type, and processed in accordance with said discriminated type. If a received document is a confidential document, a confidential reception display request is sent to the operation panel section (#76). If a received document is a receipt, a receipt display request is sent to the operation panel section (#77). If a received document is not a confidential document, a print request is sent to the print section (#74), and the image data are transferred (#75).

Figure 18:
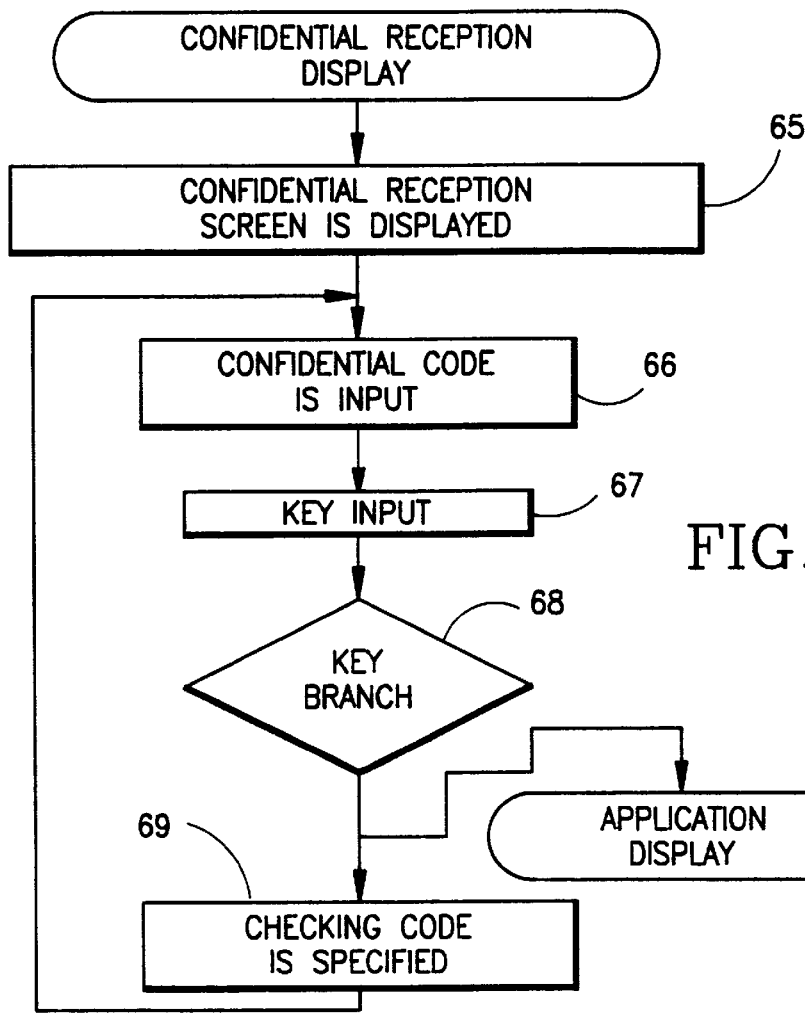
FIG. 18 is a flow chart showing the operational content of the confidential reception display.
Figure 19:
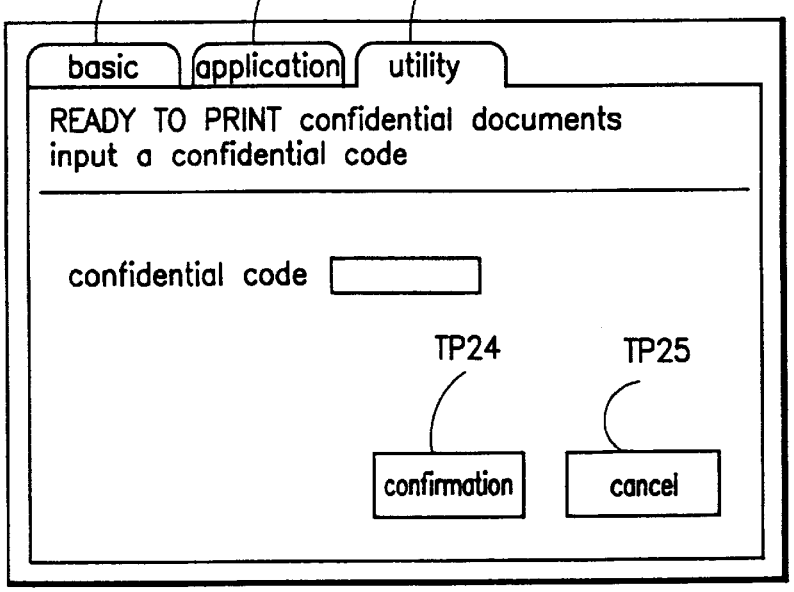
FIG. 19 is an illustration showing the confidential reception screen of the liquid crystal touch panel.

(7) Printing Confidential Documents and Automatic Receipt Transfer (a) Operation panel section (CPU 101) in the confidential reception print routine FIG. 18 is a flow chart of the operation panel section of the confidential reception print routine. Referring to FIG. 18, in the confidential reception routine, the confidential reception screen (refer to FIG. 19) is read out from NVRAM 127 and displayed on the liquid crystal touch panel 91 of the operation panel OP (#65), and input from the liquid crystal touch panel 91 is awaited. When a confidential code is entered on the operation panel OP (#66) and input is generated via the liquid crystal touch panel 91 (#67), the content of the key input is detected by the key branch (#68), and processing is executed in accordance with said key input. For example, when the confirmation key (TP 24 in FIG. 19) is pressed, a check of the input confidential code is specified to the control section (CPU 104) (#69). If the cancel key (TP 25 in FIG. 19) is pressed, the program moves to the application display routine.

(b) Control section (CPU 104) in the confidential reception print routine

Figure 20:
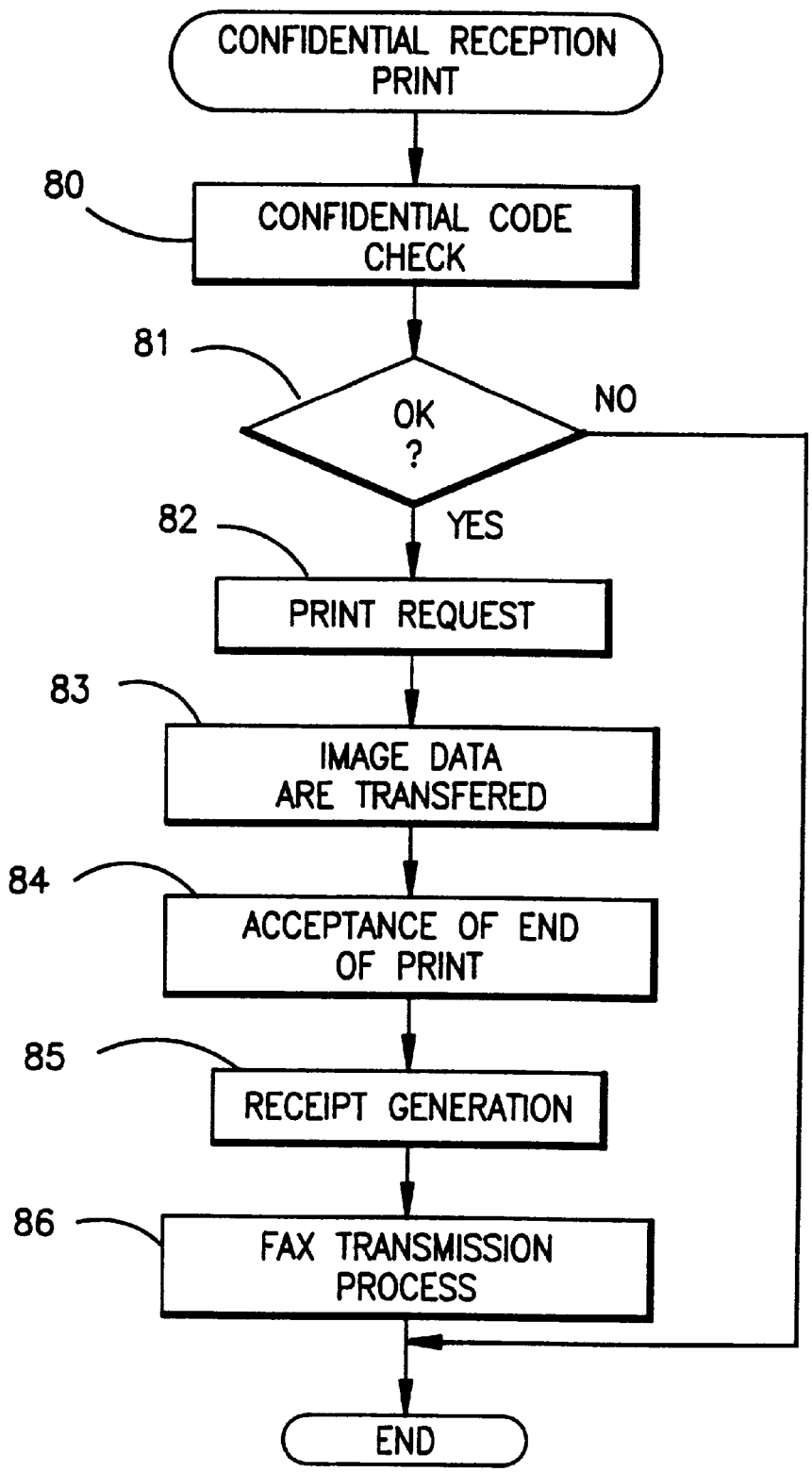
FIG. 20 is a flow chart showing the operational content of the confidential reception print control section.

FIG. 20 is a flow chart showing the control contents of the control section in the confidential reception print routine. In the confidential reception print control, first a confidential code check is executed (#80), and the program moves to appropriate processing in accordance with said check result (#81). For example, if printing is accepted (#81: YES), a print request is sent to the print section (#82), and the image data are transferred (#83). When a print end reply is received (#84), a receipt is generated (#85) and transmitted to the destination (#86). If the confidential code is not accepted (#81: NO), no process is executed.

(8) Printing the Confidential Transmission Receipt List

The confidential reception receipt list is a list generated on the sending side and lists the receipts returned to the sending side for reception confirmation when a document has been sent by confidential transmission from a sending apparatus and received and printed by a receiving apparatus. That is, this list is generated by the sending apparatus. Receipts are generated on the receiving side, and have the confidential code data and fax number data appended thereon, and are transmitted in reply to the sending apparatus. After the sending apparatus generates a confidential transmission receipt list, the sending apparatus automatically generates and transmits a receipt request (refer to FIG. 29) to receiving apparatuses which have not yet transmitted a confidential transmission receipt, i.e., from which a receipt has not yet been received.

(a) Operation panel section (CPU 101) in the utility display routine

Figure 21:
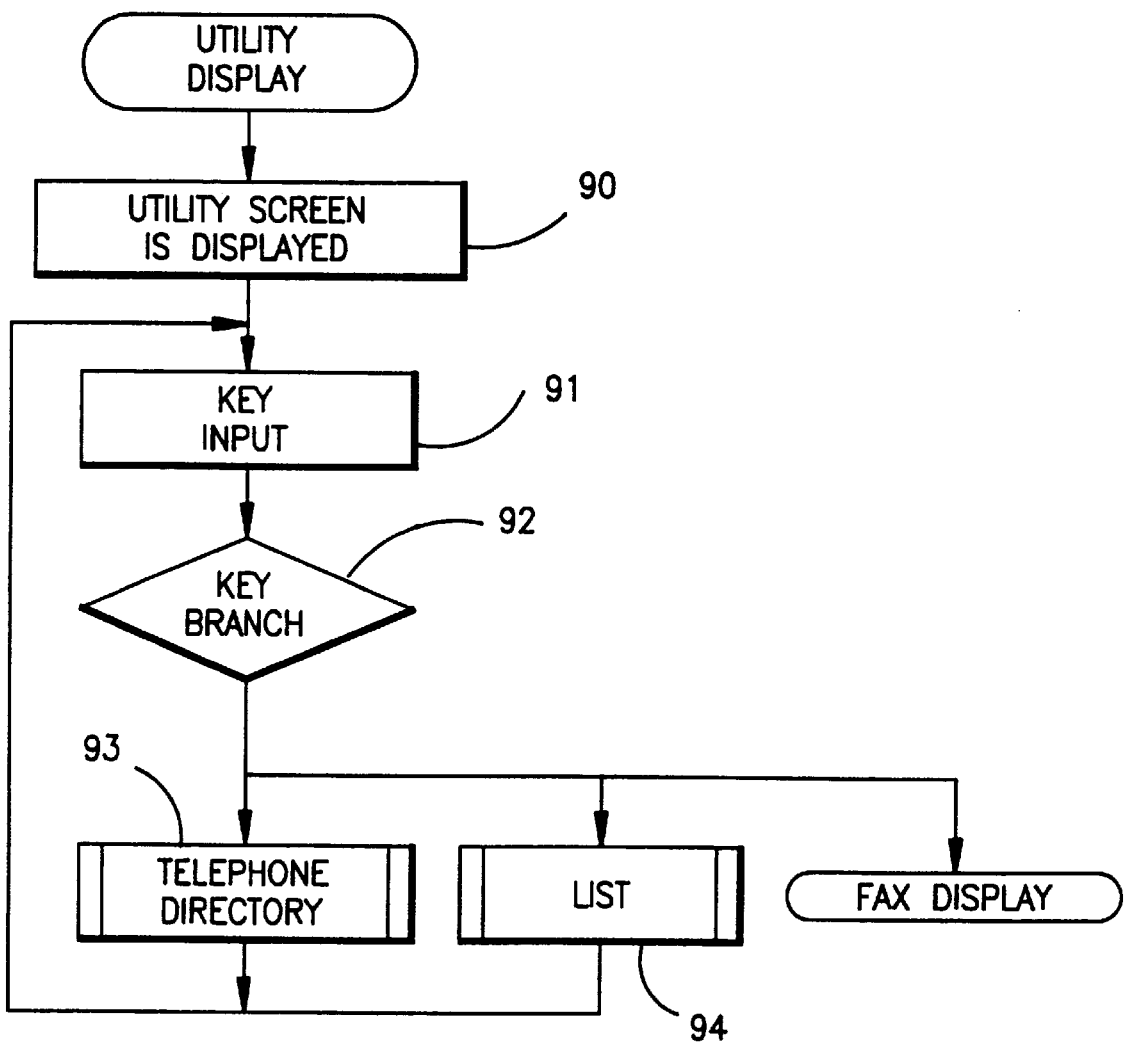
FIG. 21 is a flow chart showing the operational content of the utility display section.
Figure 22:
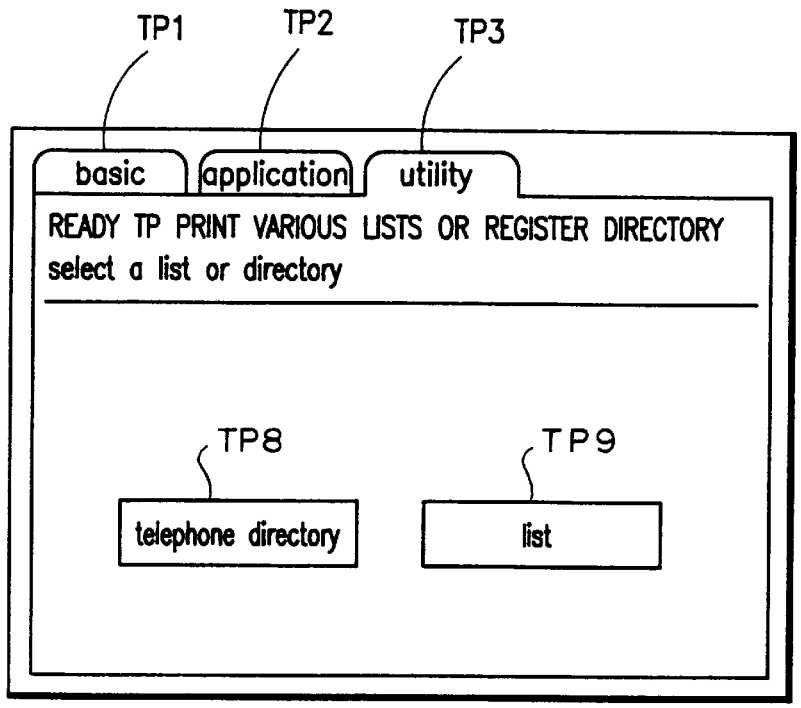
FIG. 22 is an illustration of the utility screen of the liquid crystal touch panel.

The confidential transmission receipt printing is achieved by the utility display routine (#14). The flow of the utility display routine is shown in FIG. 21. In the utility display routine, the utility screen (refer to FIG. 22) is read out from NVRAM 127 and displayed on liquid crystal touch panel 91 of operation panel OP (#90), and input via liquid crystal touch panel 91 is awaited. When there is input from liquid crystal touch panel 91, the content of the key input is detected by key branch (#92), and the program moves to the display mode corresponding to said key input. For example, if the telephone directory key TP 8 is pressed, the program moves to the telephone directory routine (#93), whereas if the list key TP 9 is pressed, the program moves to the list routine (#94). If the basic key TP 1 is pressed, the program moves to the fax display routine.

Figure 23:
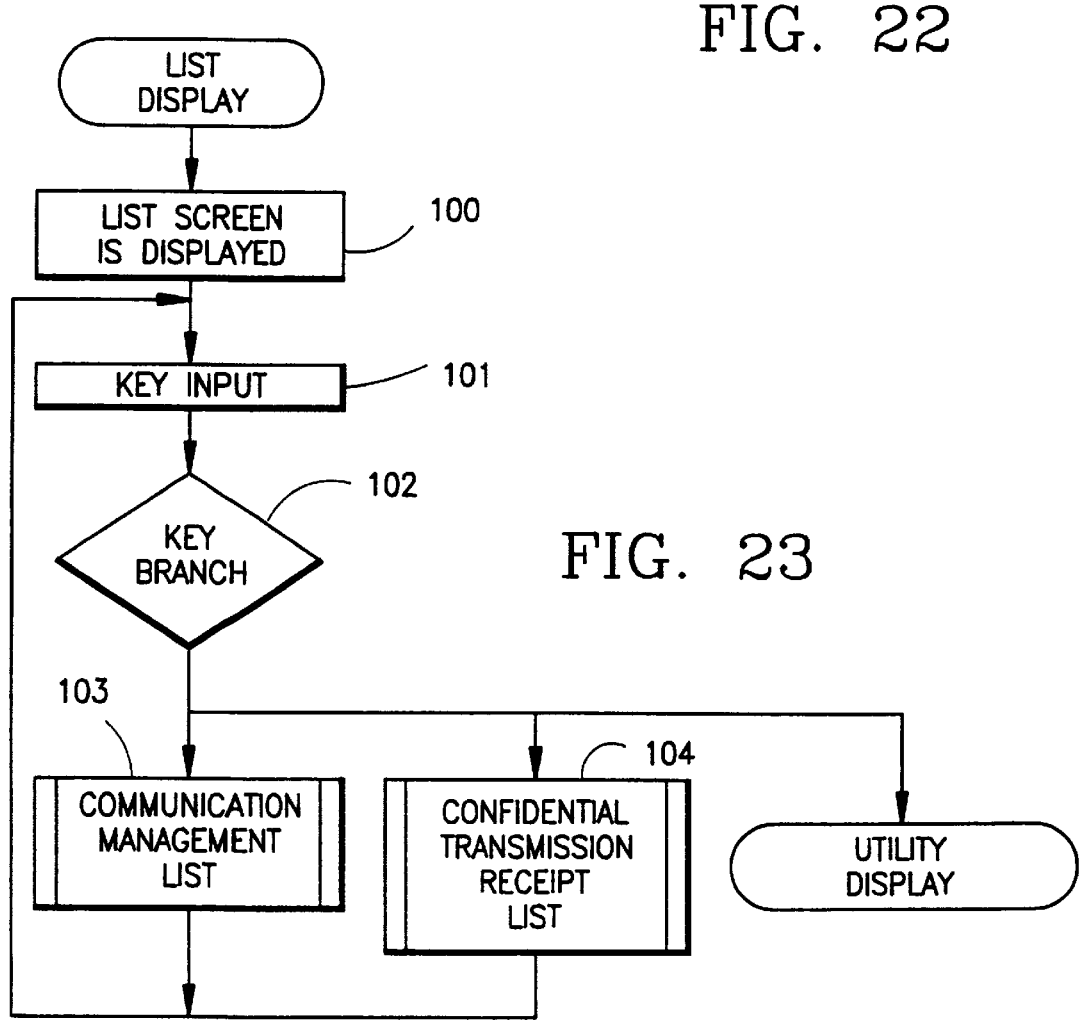
FIG. 23 is a flow chart showing the operational content of the list display section.
Figure 24:
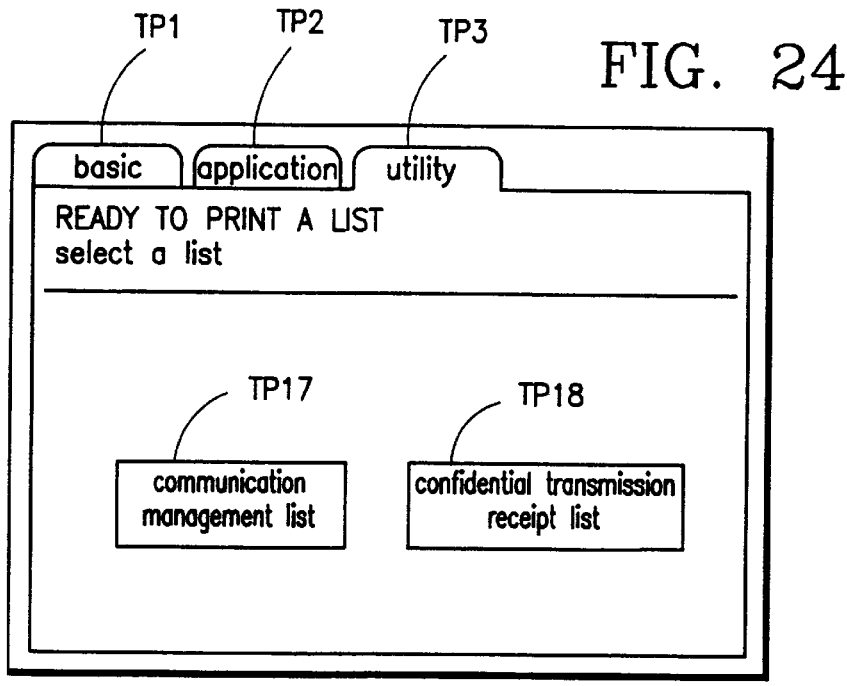
FIG. 24 is an illustration showing the list screen of the liquid crystal touch panel.

The flow chart of FIG. 23 shows the specific content of the aforesaid list display routine (#94 in FIG. 21). In the list display routine, first the list screen (refer to FIG. 24) is read out from NVRAM 127 and displayed on liquid crystal touch panel 91 of the operation panel OP (#100), and input from the liquid crystal touch panel 91 is awaited. When there is input from the liquid crystal touch panel 91 (#101), the contents of the key input is detected by key branch (#102), the program moves to the display mode corresponding to said key input. For example, if the communication management list key TP 17 (refer to FIG. 24) is pressed, the program moves to the communication management list routine (#103), whereas if the confidential transmission receipt list key TP 18 is pressed, the program moves to the confidential transmission receipt list routine (#104). If the utility key TP 3 is pressed, the program moves to the utility display mode.

Figure 25:
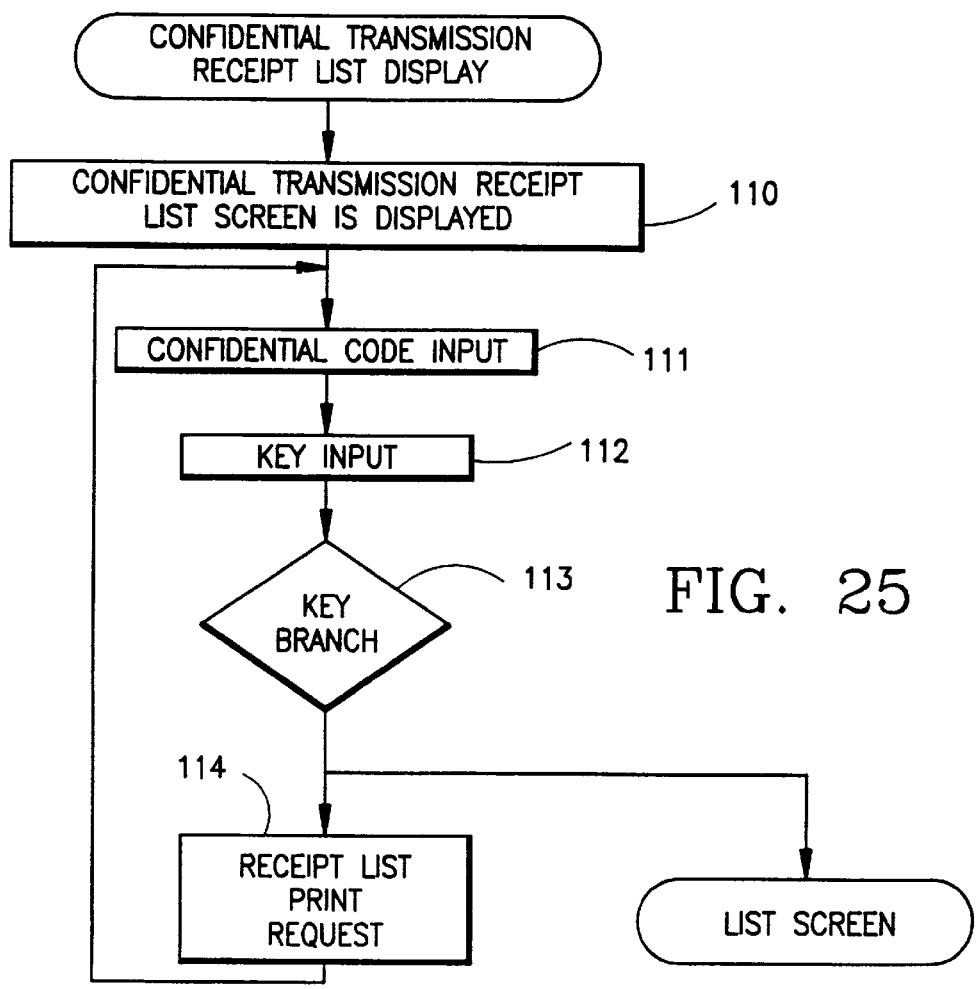
FIG. 25 is a flow chart showing the operational content of the confidential transmission request list display section.
Figure 26:
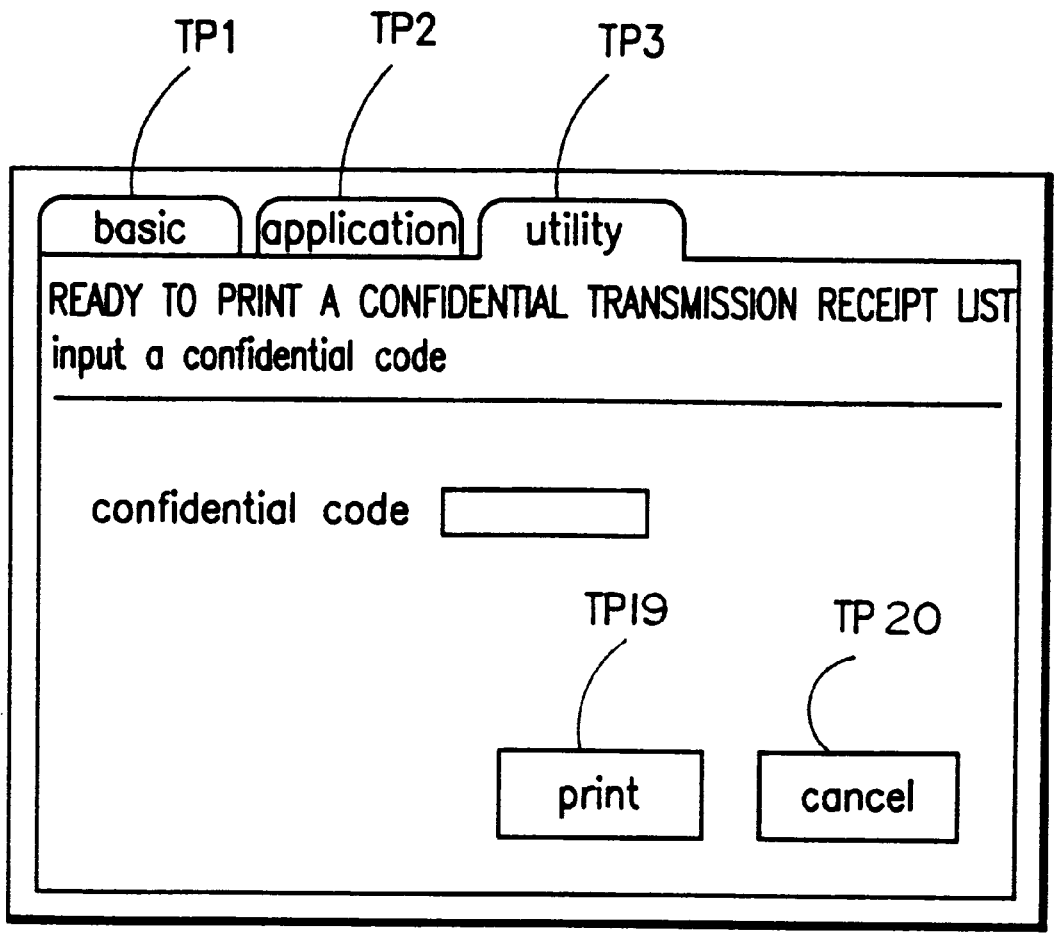
FIG. 26 is an illustration showing the confidential transmission request screen of the liquid crystal touch panel.

FIG. 25 is a flow chart of the aforesaid confidential transmission receipt list routine. In the confidential transmission receipt list display routine, first the confidential transmission receipt list screen (refer to FIG. 26) is read out from NVRAM 127 and displayed on liquid crystal touch panel 91 of operation panel OP (#110), and input from the liquid crystal touch panel is awaited. When there is key input from liquid crystal touch panel 91 (112), the content of said key input is detected by key branch (#113) and the program moves to processes corresponding to said key input. For example, if the print key TP 19 (refer to FIG. 26) is pressed, a receipt list print request is sent to the control section (#114), whereas if the cancel key TP 20 is pressed, the program moves to the list screen display routine.

(b) Control section (CPU 104) in the confidential transmission receipt routine

Figure 27:
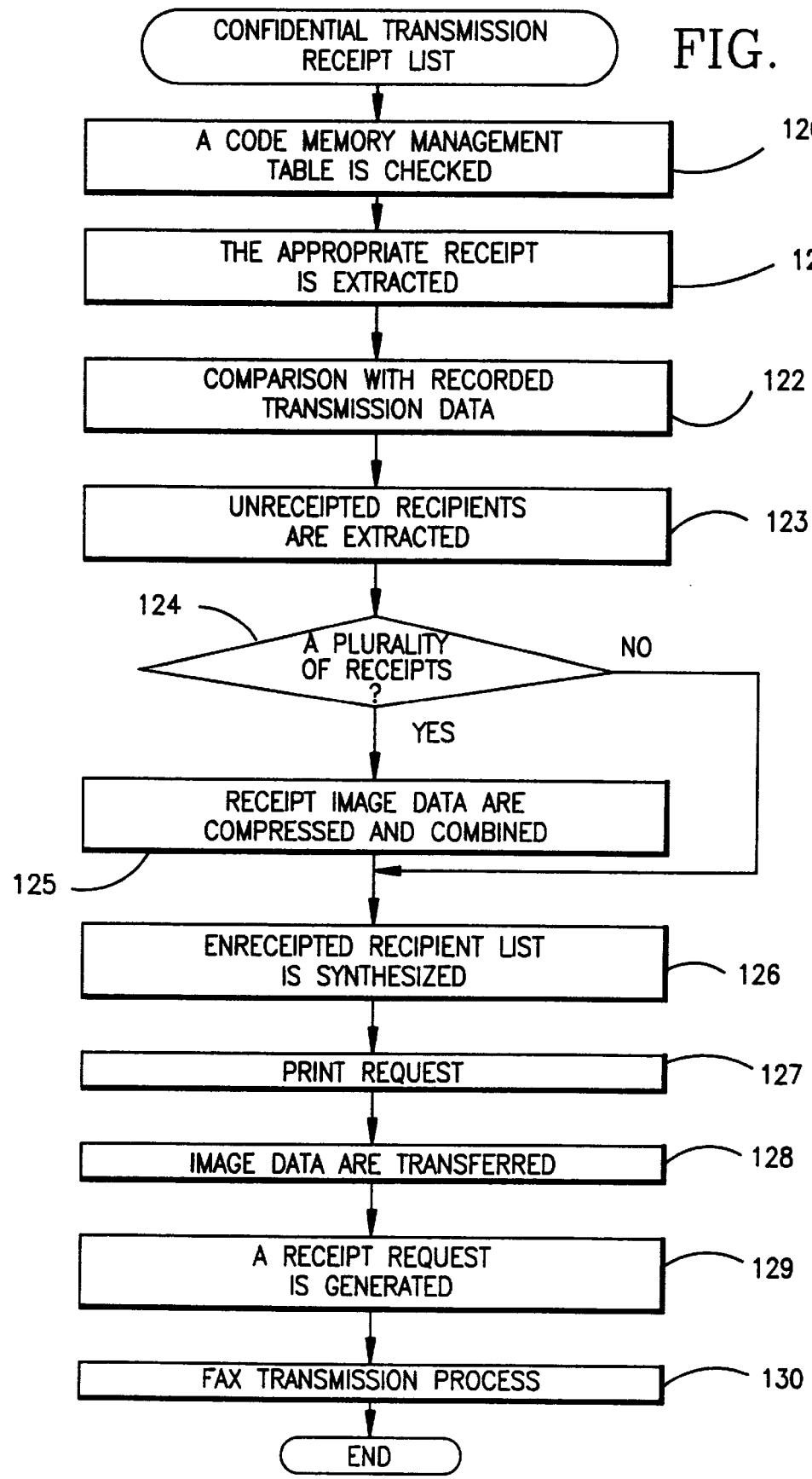
FIG. 27 is a flow chart showing the control content of the confidential transmission request list control section.

A flow chart of the control section in the confidential transmission receipt routine is shown in FIG. 27. In the print control of the confidential transmission receipt list, first a check is made of the code memory management table (#120), and the image data of the appropriate receipt is extracted (#121). The recorded transmission data and the received receipt data are compared (#122), and unreceipted recipients are extracted (#123). If a plurality of receipts are received (#124: YES), the extracted receipt image data are compressed and combined so as to fit on one page (#125). Then, an unreceipted recipient list is synthesized (#126), and after a print request is sent to the print section (#127), the image data are transferred to the print section (#128). When no receipts have yet been received or only a single receipt has been received, the receipt image data compression and combination process is not executed (#124: NO). After receipt list image data have been transferred (#128), a receipt request is generated for transmission to the unreceipted recipients (#129), and said data are faxed to the unreceipted recipients (#130).

Although receipt image data are generated on the receiving side in the present embodiment, said receipt image data may be generated on the sending side. Furthermore, when it is difficult to render the confidential transmission receipt list on a single sheet of paper due to a high number of destinations, the list may be divided and printed on two or more sheets.

As described above, when there are replies specifying confidential reception from a plurality of facsimile apparatuses, the confidential transmission completion reports from a plurality of facsimile apparatuses can be output in a batch, thereby easily confirming that the intended recipients have reliably received the transmitted documents.

When a number of replies indicating reception of confidential transmission is forthcoming from a plurality of facsimile apparatuses, these replies are compared to destinations stored in memory to detect destinations which have not yet replied. As a result, destinations that have not had confidential reception can be immediately confirmed, and confidential reception can be requested for said destinations.

Since a request for confidential reception is executed at the same time as the confidential transmission completion report is output, a separate process for recipients that have not had confidential reception is unnecessary, and requests can be made more quickly.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A facsimile apparatus which is capable of confidential transmission and reception, the facsimile apparatus comprising:

means for sending a confidential transmission of a document to a plurality of receiving apparatuses;

means for receiving a confirmation of confidential reception of the confidential transmission from the plurality of receiving apparatuses;

means for printing a receipt based on the confirmation; and means for controlling the printing means so as to print in a batch as one unit a plurality of receipts relating only to the confidential transmission of the document when a plurality of confirmations are received.

2. The facsimile apparatus as claimed in claim 1, wherein the confidential transmission includes an image, a fax number and a password.

3. The facsimile apparatus as claimed in claim 1, wherein the plurality of receipts are combined and printed on one sheet of paper.

4. The facsimile apparatus as claimed in claim 1, wherein the plurality of the receipts are combined prior to printing the plurality of receipts.

5. The facsimile apparatus as claimed in claim 4, wherein the plurality of receipts is printed based on one operation.

6. The facsimile apparatus as claimed in claim 1, wherein the plurality of receipts is printed based on one operation.

7. A facsimile apparatus, comprising:

means for sending an image and a password to a plurality of receiving apparatuses;

means for receiving reports from the receiving apparatuses which have printed the image indicating that the received image has been printed with the use of the password; and means for printing print states for all of the plurality of receiving apparatuses based on the reports whether or not the facsimile apparatus has received a confirmation report from a particular receiving apparatus.

8. The facsimile apparatus as claimed in claim 7, further comprising:

means for sending a request for a report to each of the receiving apparatuses which have not yet sent reports to the receiving means of the image sending apparatus.

9. The facsimile apparatus as claimed in claim 7, wherein the sending means sends a fax number with the image and the password.

10. A facsimile apparatus provided with a confidential sending and receiving function that allows an image that is transmitted to a receiving apparatus with a password to be printed by the receiving apparatus on condition that a password is entered in the receiving apparatus that is the same as the password that is transmitted with the image, the facsimile apparatus comprising:

first sending means for sending a confidential transmission to a plurality of receiving apparatuses;

means for receiving a report from the receiving apparatuses indicating that the image has been printed;

means for comparing reports received by the receiving means with a list of the plurality of receiving apparatuses and for specifying which receiving apparatuses have not yet transmitted a report; and second sending means for sending a request for printing to the receiving apparatuses specified by the specifying means.

11. The facsimile apparatus as claimed in claim 6, further comprising list printing means for printing a result of the specifying means.

12. The facsimile apparatus as claimed in claim 11, wherein the list printing means prints a list of the receiving apparatuses that have sent reply reports and a list of the receiving apparatuses that have not yet sent reply reports.

13. The facsimile apparatus as claimed in claim 11, wherein the second sending means sends the request when the list printing means prints the result.

14. The facsimile apparatus as claimed in claim 10, wherein the comparing means is automatic.

15. The facsimile apparatus as claimed in claim 14, wherein the second sending means is automatic.

16. The facsimile apparatus as claimed in claim 10, wherein the second sending means is automatic.

17. A communication apparatus which has a function of transmitting a document and a function of receiving a document, the communications apparatus comprising:

first sending means for transmitting image data of the document, a password, and the sending communication apparatus fax number to a plurality of destinations;

sending memory means for storing data relating to the plurality of destinations;

receiving memory means for storing received image data and a password and a sending communication apparatus fax number received with the received image data;

means for indicating image data has been received with a password;

means for printing the received image data stored in the receiving memory means when an input password is identical to the password stored in the receiving memory means;

reply means for retrieving the sending communication apparatus fax number from the receiving memory means, dialing the sending communication apparatus fax number, and transmitting a reply report indicating the received image data has been printed;

means for receiving reply reports;

means for comparing the plurality of destinations stored in the sending memory means and reply reports received by the receiving means from the plurality of destinations; and means for printing a result of the comparing means.

18. The communication apparatus as claimed in claim 17, wherein the printing means prints a list of the destinations that have sent reply reports and a list of the destinations that have not sent reply reports.

19. The communication apparatus as claimed in claim 17, further comprising second sending means for sending a print request to destinations that have not yet sent reply reports.

20. The communication apparatus as claimed in claim 19, wherein the second sending means sends the request when the printing means prints the result.

21. A facsimile apparatus which is capable of confidential transmission and reception, the facsimile apparatus comprising:

means for sending a confidential transmission of a document to a plurality of receiving apparatuses;

means for receiving a confirmation of confidential reception of the confidential transmission from the plurality of receiving apparatuses;

means for printing a receipt based on the confirmation; and means for controlling the printing means so as to combine and print in a batch a plurality of receipts relating only to the confidential transmission of the document when a plurality of confirmations are received.

* * * * *